(12) United States Patent
Cheng et al.

(10) Patent No.: US 7,560,176 B2
(45) Date of Patent: Jul. 14, 2009

(54) LIGHT-EMITTING ELEMENT AND IRIDIUM COMPLEX

(75) Inventors: Chien-Hong Cheng, Hsinchu (TW); Ruey-Min Chen, Tainan County (TW); Cheng-Wei Huang, Tainan County (TW); Chen-Chung Yang, Tainan County (TW)

(73) Assignees: Chi Mei Optoelectronics Corp., Tainan County (TW); National Tsing Hua University, Hsinchu (TW)

( * ) Notice: Subject to any disclaimer, the term of this patent is extended or adjusted under 35 U.S.C. 154(b) by 279 days.

(21) Appl. No.: 10/902,977

(22) Filed: Jul. 29, 2004

(65) Prior Publication Data
US 2005/0025995 A1  Feb. 3, 2005

(30) Foreign Application Priority Data
Jul. 30, 2003  (TW) ............... 92120909 A

(51) Int. Cl.
*H01L 51/54* (2006.01)
*C09K 11/06* (2006.01)

(52) U.S. Cl. .............. 428/690; 428/917; 313/504; 313/506; 257/E51.044; 546/10; 549/3; 549/209

(58) Field of Classification Search ............... None
See application file for complete search history.

(56) References Cited

U.S. PATENT DOCUMENTS

| 6,787,249 | B2 | 9/2004 | Seo |
| 7,238,435 | B2 | 7/2007 | Kamatani et al. |
| 2001/0019782 | A1 | 9/2001 | Igarashi et al. |
| 2002/0024293 | A1 | 2/2002 | Igarashi et al. |
| 2002/0034656 | A1 | 3/2002 | Thompson et al. |
| 2002/0048689 | A1 | 4/2002 | Igarashi et al. |
| 2002/0063516 | A1* | 5/2002 | Tsuboyama et al. ......... 313/504 |
| 2002/0064681 | A1* | 5/2002 | Takiguchi et al. ........... 428/690 |
| 2002/0121638 | A1 | 9/2002 | Grushin et al. |
| 2002/0182441 | A1 | 12/2002 | Lamansky et al. |
| 2003/0017361 | A1 | 1/2003 | Thompson et al. |
| 2003/0059646 | A1* | 3/2003 | Kamatani et al. ........... 428/690 |
| 2003/0072964 | A1* | 4/2003 | Kwong et al. ............... 428/690 |
| 2003/0096138 | A1 | 5/2003 | Lecloux et al. |

FOREIGN PATENT DOCUMENTS

| JP | 2003-109758 A | 4/2003 |
| WO | WO 02/064700 A1 | 8/2002 |

OTHER PUBLICATIONS

K. Dedeian et al., "A New Synthetic Route to . . . Complexes of Iridium(III) with Substituted 2-Phenylpyridines", Inorganic Chemistry 30(8), pp. 1685-1687 (1991).*

* cited by examiner

*Primary Examiner*—Marie R. Yamnitzky
(74) *Attorney, Agent, or Firm*—Finnegan, Henderson, Farabow, Garrett & Dunner LLP

(57) ABSTRACT

Iridium compounds having at least two 2-arylpyridine ligands in which a non-hydrogen atom group is substituted at the 4-position of the pyridine ring, and light-emitting elements comprising on organic layer comprising at least one of the iridium compounds are disclosed.

10 Claims, 1 Drawing Sheet

LIGHT-EMITTING ELEMENT AND IRIDIUM COMPLEX

This application claims the right to foreign priority based on Patent Application No. 92120909, filed Jul. 30, 2003, in Taiwan, which is incorporated herein by reference.

FIELD

This disclosure relates to iridium compounds and light-emitting elements comprising iridium compounds. Iridium compounds having at least two 2-arylpyridine ligands in which a non-hydrogen atom group is substituted at the 4-position of the pyridine ring, and light-emitting elements comprising on organic layer comprising at least one of the iridium compounds are disclosed. Light-emitting elements comprising the iridium compounds can be used in, for example, display devices, displays, backlights, and illumination light sources.

INTRODUCTION

Electroluminescent ("EL") devices using organic luminescent materials have the potential to afford displays with wider viewing angles and faster response times compared to conventional liquid crystal displays ("LCD"). It is anticipated that spontaneous light emission producing organic luminescent materials can afford high response speeds and wide viewing angles. When incorporated in consumer electronic devices such as digital cameras, personal digital assistants, and videophones, EL devices using organic luminescent materials can further afford several advantages such as low power consumption, high brightness, and facilitate light and thin design.

Certain organic EL devices comprise an organic thin film layer that includes a luminescent material capable of emitting light upon application of an electric current. The organic thin film layer can be formed between an anode and a cathode. For the production of a full-color EL display panel, it can be useful to have efficient red, green and blue (RGB) EL materials with proper chromaticity and sufficient luminance efficiency.

Iridium compounds such as $Ir(ppy)_3$, tris-ortho-metalated complex of iridium (III) with 2-phenylpyridine, can be used as a luminescent material to produce organic EL devices having improved luminance efficiency (Applied Physics Letters, vol. 75, p. 4, 1999). Such devices can attain an external quantum yield of 8%, which is higher than the 5% external quantum yield of conventional light-emitting elements.

Other luminescent materials are disclosed in U.S. Published Application 2003/0148142 to Fryd et al., published Aug. 7, 2003; U.S. Published Application 2002/0121638 to Grushin et al., published Sep. 5, 2002; U.S. Published Application 2002/0024293 to Igarashi et al., published Feb. 28, 2002; U.S. Published Application 2001/0019782 to Igarashi et al., published Sep. 6, 2001; U.S. Published Application 2003/0096138 to Lecloux et al., published May 22, 2003; U.S. Published Application 2002/0034656 to Thompson et al., published Mar. 21, 2002; U.S. Published Application 2003/0173896 to Grushin et al., published Sep. 18, 2003; U.S. Published Application 2002/0182441 to Lamansky et al., published Dec. 5, 2002; U.S. Published Application 2003/0162299 to Hsieh et al., published Aug. 28, 2003; U.S. Published Application 2003/0198831 to Oshiyama et al., published Oct. 23, 2003; U.S. Published Application 2003/0017361 to Thompson et al., published Jan. 23, 2003; WO/064700; and a published article entitled "Electrophosphorescent Light Emitting Devices Using New Iridium(III) Complexes, Mat. Res. Soc. Symp. Proc., Vol. 708 (2002) Materials Research Society, the portions related to luminescent materials of which are hereby incorporated by reference.

However, there is a continuing need for light-emitting materials having improved luminance efficiency.

SUMMARY

The present disclosure provides iridium compounds having at least two 2-arylpyridine ligands in which a non-hydrogen atom group is substituted at the 4-position of the pyridine ring. A first aspect of the present disclosure provides light-emitting materials comprising a compound including a partial structure chosen from Formula (I), and (II):

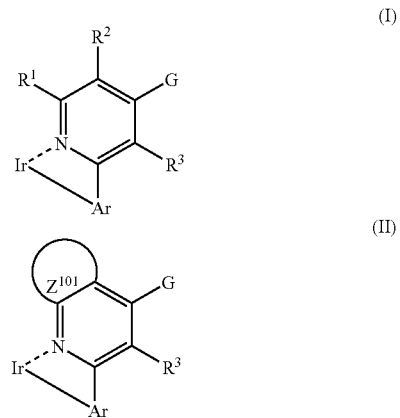

wherein $R_1$, $R_2$, and $R_3$ are independently chosen from hydrogen, halogen, alkyl, substituted alkyl, alkoxy, substituted alkoxy, cycloalkyl, substituted cycloalkyl, alkenyl, substituted alkenyl, alkynyl, substituted alkynyl, aryl, substituted aryl, heteroaryl, substituted heteroaryl, alkylthio, alkyl alkoxy, substituted alkyl alkoxy, acyl, acyloxy, aminoacyl, sulfonyl, sulfinyl, silyl, and a boron group;

Ar is chosen from arylene, substituted arylene, heteroarylene, and substituted heteroarylene;

G is chosen from a non-hydrogen atom group, such as alkyl, substituted alkyl, aryl, substituted aryl, heteroaryl, substituted heteroaryl, alkoxy, substituted alkoxy, aryloxy, substituted aryloxy, dialkylamino, substituted dialkylamino, alkylamino, substituted alkylamino, diarylamino, substituted diarylamino, amino, substituted amino, cyano, F, silyl, and a boron group; and $Z^{101}$ comprises a group, wherein $Z^{101}$ together with the carbon atoms to which $Z^{101}$ is attached form an aryl, substituted aryl, heteroaryl, or substituted heteroaryl ring;

with the provisos that $R^1$, $R^2$, $R^3$, and G are not chosen from F, $-C_nF_{2n+1}$, $-OC_nF_{2n+1}$, and $-OCF_2X$, wherein n is an integer from 1 to 6, and X is chosen from H, Cl, and Br;

when Ar is chosen from substituted arylene, then the substitute groups are not chosen from F, $-C_nF_{2n+1}$, $-OC_nF_{2n+1}$, and $-OCF_2X$, wherein n is an integer from 1 to 6, and X is chosen from H, Cl, and Br; and when G is chosen from $-OCH_3$, and $-N(CH_3)_2$, then Ar is not phenylene.

A second aspect of the present disclosure provides light-emitting elements comprising an anode, a cathode, and an organic layer comprising a light-emitting layer disposed between the anode and the cathode, wherein the light-emitting layer comprises at least one compound having a partial structure chosen from Formula (I), and Formula (II).

A third aspect of the present disclosure provides light-emitting materials comprising a compound of Formula (VIII)

$$Ir\text{-}L^a\text{-}L^b\text{-}L^c{}_x\text{-}L'{}_y\text{-}L''{}_z \qquad (VIII)$$

wherein x is chosen from 0, and 1;
y is chosen from 0, 1, and 2;
z is chosen from 0, and 1;
L' is chosen from a monodentate ligand, and a bidentate ligand,
L" is chosen from a monodentate ligand; and
$L^a$, $L^b$, and $L^c$ are independently chosen from Formula (IX), and Formula (X):

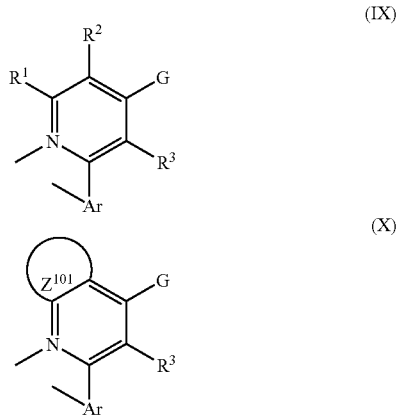

wherein
either x=0, or y+z=0;
when y=2, then z=0;
L' and L" are not chosen from a phosphorous ligand;
when L' is a monodentate ligand, then y+z=2;
when L' is a bidentate ligand, then y=1, and z=0;
$R_1$, $R_2$, and $R_3$ are independently chosen from hydrogen, halogen, alkyl, substituted alkyl, alkoxy, substituted alkoxy, cycloalkyl, substituted cycloalkyl, alkenyl, substituted alkenyl, alkynyl, substituted alkynyl, aryl, substituted aryl, heteroaryl, substituted heteroaryl, alkylthio, alkyl alkoxy, substituted alkyl alkoxy, acyl, acyloxy, aminoacyl, sulfonyl, sulfinyl, silyl, and a boron group;
Ar is chosen from arylene, substituted arylene, heteroarylene, and substituted heteroarylene;
G is chosen from alkyl, substituted alkyl, alkoxy, substituted alkoxy, aryl, substituted aryl, heteroaryl, substituted heteroaryl, amino, substituted amino, cyano, F silyl, and a boron group; and
$Z^{101}$ comprises a group, wherein $Z^{101}$ together with the carbon atoms to which $Z^{101}$ is attached form an aryl, substituted aryl, heteroaryl, or substituted heteroaryl ring;
with the provisos that
$R^1$, $R^2$, $R^3$, and G are not chosen from F, $-C_nF_{2n+1}$, $-OC_nF_{2n+1}$, and $-OCF_2X$, wherein n is an integer from 1 to 6, and X is chosen from H, Cl, and Br;
when Ar is chosen from substituted arylene, then the substitute groups are not chosen from F, $-C_nF_{2n+1}$, $-OC_nF_{2n+1}$, and $-OCF_2X$, wherein n is an integer from 1 to 6, and X is chosen from H, Cl, and Br; and
when G is chosen from $-OCH_3$ or $-N(CH_3)_2$, then Ar is not $C_6$ arylene.

A fourth aspect of the present disclosure provides light-emitting elements comprising an anode, a cathode, and an organic layer disposed between the anode and the cathode, wherein the organic layer comprises a light-emitting layer wherein the light-emitting layer comprises a compound of Formula (IV).

Additional embodiments of the invention are set forth in the description which follows, or may be learned by practice of the invention.

DEFINITIONS USED IN THE PRESENT DISCLOSURE

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the standard deviation found in their respective testing measurements. At the very least, and not as an attempt to limit the application of the doctrine of equivalents to the scope of the claims, each numerical parameter as set forth in the claims should at least be construed in light of the number of reported significant digits and by applying ordinary rounding techniques.

"Acyl" refers to a radical —C(O)R, where R is hydrogen, alkyl, cycloalkyl, aryl, arylalkyl, heteroalkyl, and heteroaryl as defined herein. Representative examples include, but are not limited to, formyl, acetyl, cylcohexylcarbonyl, cyclohexylmethylcarbonyl, benzoyl, benzylcarbonyl, pivaloyl, and the like.

"Acyloxy" refers to a radical —OC(O)R where R is hydrogen, alkyl, heteroalkyl, cycloalkyl, aryl, heteroaryl, or arylalkyl as defined herein.

"Alkoxycarbonylamino" refers to a radical —NHC(O)OR where R is hydrogen, alkyl, heteroalkyl, cycloalkyl, aryl, heteroaryl, or arylalkyl, as defined herein.

"Aminoacyl" refers to a radical —NRC(O)R', where R and R' are each independently chosen from hydrogen, alkyl, cycloalkyl, aryl, arylalkyl, heteroalkyl, and heteroaryl, as defined herein. Representative examples include, but are not limited to, formylamino, acetylamino, cylcohexylcarbonylamino, cyclohexylmethyl-carbonylamino, benzoylamino, benzylcarbonylamino, and the like.

"Alkenyl" refers to an unsaturated branched, straight-chain or cyclic alkyl group having at least one carbon-carbon double bond derived by the removal of one hydrogen atom from a single carbon atom of a parent alkene. The group may be in either the cis or trans conformation about the double bond(s). Typical alkenyl groups include, but are not limited to, ethenyl; propenyls such as prop-1-en-1-yl, prop-1-en-2-yl, prop-2-en-1-yl (allyl), prop-2-en-2-yl, cycloprop-1-en-1-yl; cycloprop-2-en-1-yl; butenyls such as but-1-en-1-yl, but-1-en-2-yl, 2-methyl-prop-1-en-1-yl, but-2-en-1-yl, but-2-en-1-yl, but-2-en-2-yl, buta-1,3-dien-1-yl, buta-1,3-dien-2-yl, cyclobut-1-en-1-yl, cyclobut-1-en-3-yl, cyclobuta-1,3-dien-1-yl; and the like. In certain embodiments, an alkenyl group has from 2 to 20 carbon atoms and in other embodiments, from 2 to 6 carbon atoms.

"Alkoxy" refers to a radical —OR where R represents an alkyl, heteroalkyl, cycloalkyl, aryl, heteroaryl, or arylalkyl group as defined herein. Representative examples include, but are not limited to, methoxy, ethoxy, propoxy, butoxy, cyclohexyloxy, and the like.

"Alkoxycarbonyl" refers to a radical —C(O)-alkoxy where alkoxy is as defined herein.

"Alkyl" refers to a saturated or unsaturated, branched, straight-chain or cyclic monovalent hydrocarbon group derived by the removal of one hydrogen atom from a single carbon atom of a parent alkane, alkene or alkyne. Typical alkyl groups include, but are not limited to, methyl; ethyls such as ethanyl, ethenyl, ethynyl; propyls such as propan-1-yl, propan-2-yl, cyclopropan-1-yl, prop-1-en-1-yl, prop-1-en-2-yl, prop-2-en-1-yl (allyl), cycloprop-1-en-1-yl; cycloprop-2-en-1-yl, prop-1-yn-1-yl, prop-2-yn-1-yl; butyls such as butan-1-yl, butan-2-yl, 2-methyl-propan-1-yl, 2-methyl-propan-2-yl, cyclobutan-1-yl, but-1-en-1-yl, but-1-en-2-yl, 2-methyl-prop-1-en-1-yl, but-2-en-1-yl, but-2-en-2-yl, buta-1,3-dien-1-yl, buta-1,3-dien-2-yl, cyclobut-1-en-1-yl, cyclobut-1-en-3-yl, cyclobuta-1,3-dien-1-yl, but-1-yn-1-yl, but-1-yn-3-yl, but-3-yn-1-yl; and the like.

The term "alkyl" is specifically intended to include groups having any degree or level of saturation, i.e., groups having exclusively single carbon-carbon bonds, groups having one or more double carbon-carbon bonds, groups having one or more triple carbon-carbon bonds and groups having mixtures of single, double and triple carbon-carbon bonds. Where a specific level of saturation is intended, the expressions "alkanyl," "alkenyl," and "alkynyl" are used. In certain embodiments, an alkyl group comprises from 1 to 20 carbon atoms. In other embodiments, an alkyl group comprises from 1 to 6 carbon atoms, and is referred to as a lower alkyl group.

"Alkylamino" refers to a radical —NHR where R represents an alkyl, heteroalkyl, cycloalkyl, aryl, heteroaryl, or arylalkyl group as defined herein. Representative examples include, but are not limited to, methylamino, ethylamino, 1-methylethylamino, cyclohexyl amino, and the like.

"Alkylthio" refers to a radical —SR where R is an alkyl, heteroalkyl, cycloalkyl, aryl, heteroaryl, or arylalkyl group as defined herein that may be optionally substituted as defined herein. Representative examples include, but are not limited to, methylthio, ethylthio, propylthio, butylthio, and the like.

"Alkylthiocarbonyl" refers to a radical —C(S)R, where R is hydrogen, alkyl, heteroalkyl, cycloalkyl, aryl, heteroaryl, or arylalkyl, as defined herein.

"Alkynyl" refers to an unsaturated branched, straight-chain or cyclic alkyl group having at least one carbon-carbon triple bond derived by the removal of one hydrogen atom from a single carbon atom of a parent alkyne. Typical alkynyl groups include, but are not limited to, ethynyl; propynyls such as prop-1-yn-1-yl, prop-2-yn-1-yl; butynyls such as but-1-yn-1-yl, but-1-yn-3-yl, but-3-yn-1-yl; and the like. In certain embodiments, an alkynyl group has from 2 to 20 carbon atoms and in other embodiments, from 3 to 6 carbon atoms.

"Amino" refers to the radical —$NH_2$.

"Aminocarbonyl" refers to the group —C(O)NRR' where R and R' are independently chosen from hydrogen, alkyl, heteroalkyl, cycloalkyl, aryl, heteroaryl, or arylalkyl, as defined herein, or optionally R and R' together with the nitrogen atom to which R and R' are attached form one or more heterocyclic or substituted heterocyclic rings. As used herein, aminocarbonyl is also referred to as carbamoyl.

"Aminosulfonyl" refers to a radical —$S(O_2)$NRR' wherein R and R' are independently chosen from hydrogen, alkyl, heteroalkyl, cycloalkyl, aryl, heteroaryl, or arylalkyl as defined herein, or optionally R and R' together with the nitrogen atom to which R and R' are attached form one or more heterocyclic or substituted heterocyclic rings. As used herein, aminosulfonyl is also referred to as sulfamoyl.

"Aryl" refers to a monovalent aromatic hydrocarbon group derived by the removal of one hydrogen atom from a single carbon atom of a parent aromatic ring system. Typical aryl groups include, but are not limited to, groups derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene, and the like. In certain embodiments, an aryl group can comprise from 6 to 20 carbon atoms.

"Arylene" refers to a divalent aromatic hydrocarbon group derived from a parent aromatic ring system. Typical arylene groups include, but are not limited to, groups derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene, and the like. In certain embodiments, an arylene group can comprise from 6 to 20 carbon atoms.

"Arylalkyl" refers to an acyclic alkyl group in which one of the hydrogen atoms bonded to a carbon atom, typically a terminal or $sp^3$ carbon atom, is replaced with an aryl group. Typical arylalkyl groups include, but are not limited to, benzyl, 2-phenylethan-1-yl, 2-phenylethen-1-yl, naphthylmethyl, 2-naphthylethan-1-yl, 2-naphthylethen-1-yl, naphthobenzyl, 2-naphthophenylethan-1-yl and the like. Where specific alkyl moieties are intended, the nomenclature arylalkanyl, arylalkenyl, and/or arylalkynyl is used. In certain embodiments, an arylalkyl group can be ($C_{6-30}$) arylalkyl, e.g., the alkanyl, alkenyl or alkynyl moiety of the arylalkyl group can be ($C_{1-10}$) and the aryl moiety can be ($C_{6-20}$).

"Arylalkyloxy" refers to an arylalkyl-O— group where arylalkyl is as defined herein.

"Aryloxycarbonyl" refers to a radical —C(O)—O-aryl where aryl is as defined herein.

"Carbonyl" refers to a radical —C(O) group.

"Carboxy" refers to the radical —C(O)OH.

"Compounds of the present disclosure" refers to compounds encompassed by generic formulae disclosed herein, any subgenus of those generic formulae, and any specific compounds within those generic or subgeneric formulae. The compounds of the present disclosure include specific specie, a subgenus or a larger genus, each of which are identified either by the chemical structure and/or chemical name. Further, compounds of the present disclosure also include substitutions or modifications of any of such species, subgenuses or genuses, which are set forth herein.

When the chemical structure and chemical name conflict, the chemical structure is determinative of the identity of the compound. The compounds of the present disclosure may contain one or more chiral centers and/or double bonds and therefore, may exist as stereoisomers, such as double-bond isomers (i.e., geometric isomers), enantiomers or diastereomers. Accordingly, any chemical structures within the scope of the specification depicted, in whole or in part, with a relative configuration encompass all possible enantiomers and stereoisomers of the illustrated compounds including the stereoisomerically pure form (e.g., geometrically pure, enantiomerically pure or diastereomerically pure) and enantiomeric and stereoisomeric mixtures. Further, when partial structures of the compounds of the present disclosure are illustrated, asterisks indicate the point of attachment of the partial structure to the rest of the molecule. Enantiomeric and stereoisomeric mixtures can be resolved into the component enantiomers or stereoisomers using separation techniques or chiral synthesis techniques well known to the skilled artisan.

"Cyano" refers to the radical —CN.

"Cycloalkyl" refers to a saturated or unsaturated cyclic alkyl group. Where a specific level of saturation is intended, the nomenclature "cycloalkanyl" or "cycloalkenyl" is used. Typical cycloalkyl groups include, but are not limited to, groups derived from cyclopropane, cyclobutane, cyclopentane, cyclohexane, and the like. In certain embodiments, the cycloalkyl group can be $C_{3-10}$ cycloalkyl, such as, for example, $C_{3-6}$ cycloalkyl.

"Dialkylamino" refers to a radical —NRR' where R and R' independently chosen from hydrogen, alkyl, heteroalkyl, cycloalkyl, aryl, heteroaryl, or arylalkyl as defined herein, or optionally R' and R" together with the nitrogen atom to which R' and R" are attached form one or more heterocyclic or substituted heterocyclic rings. Representative examples include, but are not limited to, dimethylamino, methylethylamino, di-(1-methylethyl)amino, (cyclohexyl)(methyl)amino, (cyclohexyl)(ethyl)amino, (cyclohexyl)(propyl)amino, and the like.

"Halogen" refers to a fluoro, chloro, bromo, or iodo group.

"Heteroalkyl, heteroalkanyl, heteroalkenyl, heteroalkynyl" refer to alkyl, alkanyl, alkenyl and alkynyl groups, respectively, in which one or more of the carbon atoms (and any associated hydrogen atoms) are each independently replaced with the same or different heteroatomic groups. Typical heteroatomic groups include, but are not limited to, —O—, —S—, —O—O—, —S—S—, —O—S—, —NR'—, =N—N=, —N=N—, —N=N—NR'—, —PH—, —P(O)$_2$—, —O—P(O)$_2$—, —S(O)—, —S(O)$_2$—, —SnH$_2$— and the like, wherein R' is hydrogen, alkyl, substituted alkyl, cycloalkyl, substituted cycloalkyl, aryl or substituted aryl.

"Heteroaryl" refers to a monovalent heteroaromatic group derived by the removal of one hydrogen atom from a single atom of a parent heteroaromatic ring system. Typical heteroaryl groups include, but are not limited to, groups derived from acridine, arsindole, carbazole, β-carboline, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene, and the like. In certain embodiments, the heteroaryl group can be between 5 to 20 membered heteroaryl, such as, for example, a 5 to 10 membered heteroaryl. In certain embodiments, heteroaryl groups can be those derived from thiophene, pyrrole, benzothiophene, benzofuran, indole, pyridine, quinoline, imidazole, oxazole, and pyrazine.

"Heteroarylene" refers to a divalent heteroaromatic group derived by the removal of two hydrogen atoms from a single atom or from two different atoms of a parent heteroaromatic ring system. Typical heteroarylene groups include, but are not limited to, groups derived from acridine, arsindole, carbazole, β-carboline, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene, and the like. In certain embodiments, a heteroarylene group can be between 5 to 20 membered heteroarylene, such as, for example, a 5 to 10 membered heteroarylene. In certain embodiments, heteroarylene groups can be those derived from thiophene, pyrrole, benzothiophene, benzofuran, indole, pyridine, quinoline, imidazole, oxazole, and pyrazine.

"Substituted" refers to a group in which one or more hydrogen atoms are each independently replaced with the same or different substituent(s). Typical substituents include, but are not limited to, —X, —R$^{10}$, —O$^-$, =O, —OR$^{10}$, —SR$^{10}$, —S$^-$, =S, —NR$^{10}$R$^{11}$, =NR$^{10}$, —CX$_3$, —CF$_3$, —CN, —OCN, —SCN, —NO, —NO$_2$, =N$_2$, —N$_3$, —S(O)$_2$ O$^-$, —S(O)$_2$OH, —S(O)$_2$R$^{10}$, —OS(O$_2$)O$^-$, —OS(O)$_2$R$^{10}$, —P(O)(O$^-$)$_2$, —P(O)(OR$^{10}$)(O$^-$), —OP(O)(OR$^{10}$)(OR$^{11}$), —C(O)R$^{10}$, —C(S)R$^{10}$, —C(O)OR$^{10}$, —C(O)NR$^{10}$R$^{11}$, —C(O)O$^-$, —C(S)OR$^{10}$, —NR$^{10}$C(O)NR$^{10}$R$^{11}$, —NR$^{10}$C(S)NR$^{10}$R$^{11}$, —NR$^{10}$C(NR$^{10}$)NR$^{10}$R$^{11}$, —C(NR$^{10}$)NR$^{10}$R$^{11}$, —S(O)$_2$NR$^{10}$R$^{11}$, —NR$^{10}$S(O)$_2$R$^{11}$, —NR$^{10}$C(O)R$^{11}$, and —S(O)R$^{10}$ where each X is independently a halogen; each R$^{10}$ and R$^{11}$ are independently hydrogen, alkyl, substituted alkyl, aryl, substituted aryl, arylalkyl, substituted arylalkyl, cycloalkyl, substituted cycloalkyl, heteroalkyl, substituted heteroalkyl, heteroaryl, substituted heteroaryl, —NR$^{12}$R$^{13}$, —C(O)R$^{12}$ or —S(O)$_2$R$^{12}$ or optionally R$^{10}$ and R$^{11}$ together with the atom to which R$^{10}$ and R$^{11}$ are attached form one or more heteroaryl, or substituted heteroaryl rings; and R$^{12}$ and R$^{13}$ are independently hydrogen, alkyl, substituted alkyl, aryl, substituted aryl, arylalkyl, substituted arylalkyl, cycloalkyl, substituted cycloalkyl, heteroalkyl, substituted heteroalkyl, heteroaryl, or substituted heteroaryl, or optionally R$^{12}$ and R$^{13}$ together with the nitrogen atom to which R$^{12}$ and R$^{13}$ are attached form one or more heteroaryl, or substituted heteroaryl rings. In certain embodiments, a tertiary amine or aromatic nitrogen may be substituted with on or more oxygen atoms to form the corresponding nitrogen oxide.

"Sulfonyl" refers to a radical —S(O)$_2$R where R is hydrogen, alkyl, heteroalkyl, cycloalkyl, aryl, heteroaryl, or arylalkyl, as defined herein.

"Sulfonylamino" refers to a radical —NHS(O)$_2$R where R is hydrogen, alkyl, heteroalkyl, cycloalkyl, aryl, heteroaryl, or arylalkyl as defined herein.

"Sulfinyl" refers to a radical —S(O)R where R is hydrogen, alkyl, heteroalkyl, cycloalkyl, aryl, heteroaryl, or arylalkyl, as defined herein.

"Silyl" refers to a radical —SiRR'R" where R, R', and R" are independently hydrogen, alkyl, heteroalkyl, cycloalkyl, aryl, or heteroaryl, as defined herein.

"Boron group" refers to a radical —BRR' where R and R' are independently hydrogen, alkyl, heteroalkyl, cycloalkyl, aryl, or heteroaryl, as defined herein.

Reference will now be made in detail to embodiments of the present disclosure. While certain embodiments of the present disclosure will be described, it will be understood that it is not intended to limit the embodiments of the present disclosure to those described embodiments. To the contrary, reference to embodiments of the present disclosure is intended to cover alternatives, modifications, and equivalents as may be included within the spirit and scope of the embodiments of the present disclosure as defined by the appended claims.

In the specification and the appended claims, the singular forms "a," "an," and "the" include plural reference unless the context clearly dictates otherwise.

DESCRIPTION

Figure 1:
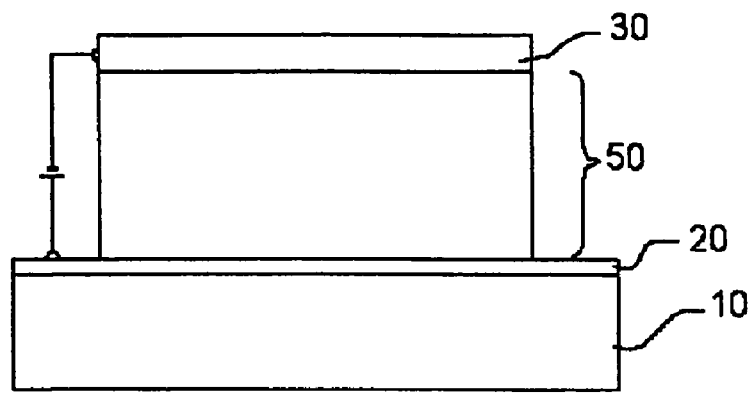
FIG. 1 is a schematic illustration of a cross-sectional view of a light-emitting element according to an embodiment of the present disclosure.

The present disclosure is generally directed to iridium compounds comprising at least two 2-arylpyridine ligands in which a non-hydrogen atom group is substituted at the 4-position of the pyridine ring. Such iridium compounds have the potential of harnessing, for example, 100% internal quantum yield. The chemical structure of iridium compounds can be modified to modulate the color, mode of energy transfer, inhibition of aggregation, and luminescence quenching. The role of the substituents is largely manifested in the electronic effects and the steric interactions. Introduction of substituents in the ligand can cause small alternations in absorption and emission spectra without appreciably changing the basic nature of the electronic transitions responsible for these spectra. However, ligand substituents can significantly reduce the deactivation of the emitting state and thereby increase the quantum yield. A bulky substituent can avoid the aggregation of molecules and reduce concentration quenching. Steric interactions are also anticipated to affect the energies of the excited states involving p-symmetry ligand orbitals due to a change in the delocalization between the rings.

Certain embodiments of the present disclosure are directed to iridium compounds comprising a partial structure chosen from Formula (I), and Formula (II):

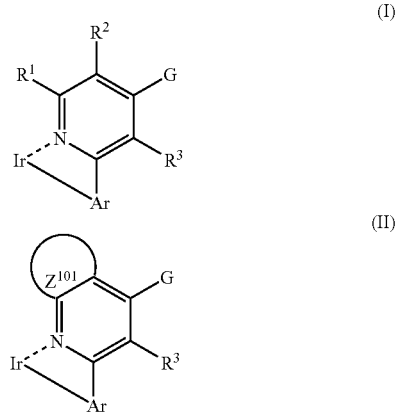

wherein $R_1$, $R_2$, and $R_3$ are independently chosen from hydrogen, halogen, alkyl, substituted alkyl, alkoxy, substituted alkoxy, cycloalkyl, substituted cycloalkyl, alkenyl, substituted alkenyl, alkynyl, substituted alkynyl, aryl, substituted aryl, heteroaryl, substituted heteroaryl, alkylthio, alkyl alkoxy, substituted alkyl alkoxy, acyl, acyloxy, aminoacyl, sulfonyl, sulfinyl, silyl, and a boron group Ar is chosen from arylene, substituted arylene, heteroarylene, and substituted heteroarylene;

G is chosen from a non-hydrogen atom group, such as alkyl, substituted alkyl, alkoxy, substituted alkoxy, aryl, substituted aryl, heteroaryl, substituted heteroaryl, aryloxy, substituted aryloxy, dialkylamino, substituted dialkylamino, alkylamino, substituted alkylamino, diarylamino, substituted diarylamino, amino, substituted amino, cyano, F, silyl, and a boron group;

$Z^{101}$ comprises a group, wherein $Z^{101}$ together with the carbon atoms to which $Z^{101}$ is attached form an aryl, substituted aryl, heteroaryl, or substituted heteroaryl ring;

with the provisos that $R^1$, $R^2$, $R^3$, and G are not chosen from F, $-C_nF_{2n+1}$, $-OC_nF_{2n+1}$, and $-OCF_2X$, wherein n is an integer from 1 to 6, and X is chosen from H, Cl, and Br; when Ar is chosen from substituted arylene, then the substitute groups are not chosen from F, $-C_nF_{2n+1}$, $-OC_nF_{2n+}$, and $-OCF_2X$, wherein n is an integer from 1 to 6, and X is chosen from H, Cl, and Br; and when G is chosen from $-OCH_3$, and $-N(CH_3)_2$, then Ar is not $C_6$ arylene.

In certain embodiments, G can be chosen from alkyl, aryl, heteroaryl, alkoxy, aryloxy, N,N'-dialkylamino, N,N'-diarylamino, alkyl ether, alkylamino, cyano, and fluorine, silyl and boron group. In certain embodiments, G can be chosen from an alkyl group having from 1 to 8 carbon atoms such as a methyl group, ethyl group, propyl group, isopropyl group, butyl group, isobutyl group, and neobutyl group. In certain embodiments, G can be chosen from an aryl group, for example, a substituted or unsubstituted phenylene group, a substituted or unsubstituted naphthalene group, a substituted or unsubstituted anthracene group, a substituted or unsubstituted phenylene-vinylene group, a substituted or unsubstituted naphthalene-vinylene group, and a substituted or unsubstituted anthracene-vinylene group. In certain embodiments, G can be chosen from a heteroaryl group, such as, for example, a substituted or unsubstituted thiophene group, a substituted or unsubstituted carbazole group, a substituted or unsubstituted pyrrole group, a substituted or unsubstituted pyridine group, a substituted or unsubstituted thiophene-vinylene, or unsubstituted carbazole-vinylene group, and a substituted or unsubstituted pyrrole-vinylene group.

In certain embodiments of compounds of Formula (I) and (II), G is chosen from $C_{1-8}$ alkyl, $C_{1-8}$ substituted alkyl, $C_{5-10}$ aryl, $C_{5-10}$ substituted aryl, $C_{5-10}$ heteroaryl, $C_{5-10}$ substituted heteroaryl, $C_{1-8}$ alkoxy, $C_{1-8}$ substituted alkoxy, $C_{1-8}$ dialkylamino, $C_{1-8}$ substituted dialkylamino, $C_{1-8}$ heteroalkyl, $C_{1-8}$ substituted heteroalkyl, $C_{1-8}$ alkylamino, $C_{1-8}$ substituted alkyl amino, —CN, and F.

In certain embodiments of compounds of Formula (I) and (II), G is chosen from $C_{1-4}$ alkyl, $C_{1-4}$ substituted alkyl, $C_{1-4}$ alkoxy, and $C_{1-4}$ substituted alkoxy.

In certain embodiments of compounds of Formula (I) and (II), $R^1$, $R^2$, and $R^3$ substituents are independently chosen from alkyl, substituted alkyl, alkoxy, substituted alkoxy, amino, alkylamino, substituted alkylamino, dialkylamino, substituted alkylamino, acyl, substituted acyl, alkoxycarbonyl, substituted alkoxycarbonyl, acyloxy, substituted acyloxy, aminoacyl, substituted aminoacyl, alkoxycarbonylamino, substituted alkoxycarbonylamino, sulfonylamino, substituted sulfonylamino, aminosulfonyl, substituted aminosulfonyl, aminocarbonyl, substituted aminocarbonyl, sulfonyl, substituted sulfonyl, sulfinyl, substituted sulfinyl, ureido, substituted ureido, phosphoamide, substituted phosphoamide, —OH, —CN, halogen, —S(O)$_2$OH, —COOH, —N(O)$_2$, —NHOH, —SOOH, —NHNH$_2$, —NH$_2$, silyl, and substituted silyl.

In certain embodiments of the compounds of Formula (II), $Z^{101}$ and the carbon atoms to which $Z^{101}$ is attached form an unsubstituted or substituted 6-member aromatic ring.

In certain embodiments of the compounds of Formula (II), the iridium compounds comprise a partial structure of Formula (III):

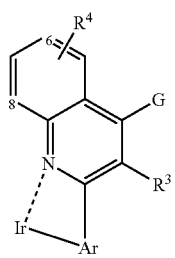

(III)

wherein $R^4$ is substituted at the 6 and 8 positions, and each $R^4$ is independently chosen from hydrogen, alkyl, substituted alkyl, heteroalkyl, substituted heteroalkyl, aryl, and substituted aryl. $R^3$, Ar, and G may be defined as described above for Formulae (I) and (II).

In certain embodiments of compounds of Formula (III), each $R^4$ is independently chosen from $C_{1-4}$ alkyl, $C_{1-4}$ substituted alkyl, $C_{1-4}$ alkoxy, and $C_{1-4}$ substituted alkoxy.

In certain embodiments of compounds of Formula (I) and (II), the compound is chosen from Formula (1), and Formula (2):

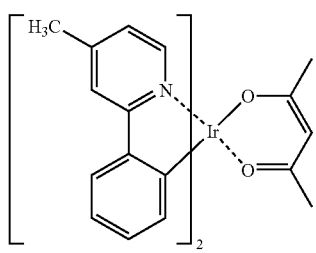

(1)

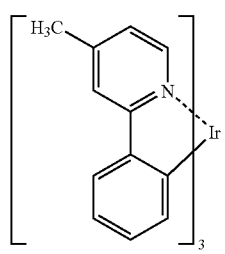

(2)

Certain iridium compounds of the present disclosure can comprise ligands having the same structure. For example, certain iridium compounds of the present disclosure have the structure of Formula (IV) and Formula (V).

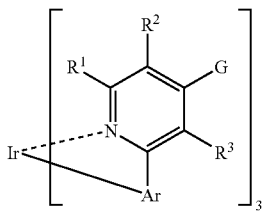

(IV)

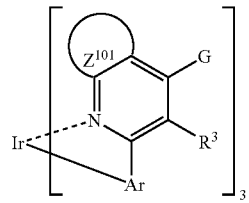

(V)

Certain iridium compounds of the present disclosure comprise ligands having different structures. For example, iridium compounds of the present disclosure can comprise ligands having more than one structure such as those represented by Formula (VI) and Formula (VII):

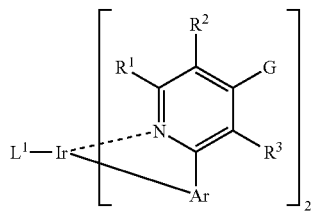

(VI)

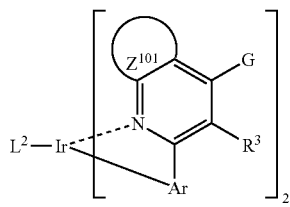

(VII)

In Formula (VI) and (VII), $L^1$ and $L^2$ can be chosen from a monodentate ligand and a bidentate ligand. $L^1$ and $L^2$ can include any appropriate ligand, such as, for example, conventional ligands known to transition metal coordination chemistry. Examples of monodentate ligands include chloride, nitrate ions, and mono-amines. Examples of bidentate ligands include compounds having two coordinating groups, such as ethylenediamine, substituted ethylene diamine, acetylacetonate, and substituted acetylacetonate.

In certain embodiments, compounds of the present disclosure are directed to compounds of Formula (VIII):

$$\text{Ir-}L^a\text{-}L^b\text{-}L^c{}_x\text{-}L'{}_y\text{-}L''{}_z \qquad \text{(VIII)}$$

wherein x is chosen from 0, and 1;
y is chosen from 0, 1, and 2;
z is chosen from 0, and 1;
L' is chosen from a monodentate ligand, and a bidentate ligand;
L" is chosen from a monodentate ligand; and
$L^a$, $L^b$, and $L^c$ are independently chosen from Formula (IX) and (X):

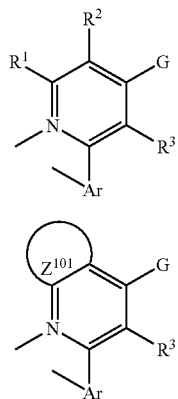

wherein
either x=0, or y+z=0;
when y=2, then z=0;
L' and L" are not chosen from a phosphorous ligand;
when L' is a monodentate ligand, then y+z=2;
when L' is a bidentate ligand, then y=1, and z=0;
$R_1$, $R_2$, and $R_3$ are independently chosen from hydrogen, halogen, alkyl, substituted alkyl, alkoxy, substituted alkoxy, cycloalkyl, substituted cycloalkyl, alkenyl, substituted alkenyl, alkynyl, substituted alkynyl, aryl, substituted aryl, heteroaryl, substituted heteroaryl, alkylthio, alkyl alkoxy, substituted alkyl alkoxy, acyl, acyloxy, aminoacyl, sulfonyl, sulfinyl, silyl, and a boron group;

Ar is chosen from arylene, substituted arylene, heteroarylene, and substituted heteroarylene;

G is chosen from a non-hydrogen atom group, such as alkyl, substituted alkyl, alkoxy, substituted alkoxy, aryl, substituted aryl, heteroaryl, substituted heteroaryl, aryloxy, substituted aryloxy, dialkylamino, substituted dialkylamino, alkylamino, substituted alkylamino, diarylamino, substituted diarylamino, amino, substituted amino, cyano, F, silyl, and a boron group, $Z^{101}$ comprises a group, wherein $Z^{101}$ together with the carbon atoms to which $Z^{101}$ is attached form an aryl, substituted aryl, heteroaryl, or substituted heteroaryl ring;

with the provisos that $R^1$, $R^2$, $R^3$, and G are not chosen from F, —$C_nF_{2n+1}$, —$OC_nF_{2n+}$, and —$OCF_2X$, wherein n is an integer from 1 to 6, and X is chosen from H, Cl, and Br;

when Ar is chosen from substituted arylene, then the substitute groups are not chosen from F, —$C_nF_{2n+1}$, —$OC_nF_{2n+1}$, and —$OCF_2X$, wherein n is an integer from 1 to 6, and X is chosen from H, Cl, and Br; and when G is chosen from —$OCH_3$ or —$N(CH_3)_2$, then Ar is not phenylene.

In certain embodiments, G can be chosen from alkyl, aryl, heteroaryl, alkoxy, aryloxy, N,N'-dialkylamino, N,N'-diarylamino, alkyl ether, alkylamino, cyano, and fluorine. In certain embodiments, G can be chosen from an alkyl group having from 1 to 8 carbon atoms such as a methyl group, ethyl group, propyl group, isopropyl group, butyl group, isobutyl group, and neobutyl group. In certain embodiments, G can be chosen from an aryl group, for example, a substituted or unsubstituted phenylene group, a substituted or unsubstituted naphthalene group, a substituted or unsubstituted anthracene group, a substituted or unsubstituted phenylene-vinylene group, a substituted or unsubstituted naphthalene-vinylene group, and a substituted or unsubstituted anthracene-vinylene group. In certain embodiments, G can be chosen from a heteroaryl group, such as, for example, a substituted or unsubstituted thiophene group, a substituted or unsubstituted carbazole group, a substituted or unsubstituted pyrrole group, a substituted or unsubstituted pyridine group, a substituted or unsubstituted thiophene-vinylene, or unsubstituted carbazole-vinylene group, and a substituted or unsubstituted pyrrole-vinylene group.

In certain embodiments of compounds of Formula (VIII), G is chosen from $C_{1-8}$ alkyl, $C_{1-8}$ substituted alkyl, $C_{5-10}$ aryl, $C_{5-10}$ substituted aryl, $C_{5-10}$ heteroaryl, $C_{5-10}$ substituted heteroaryl, $C_{1-8}$ alkoxy, $C_{1-8}$ substituted alkoxy, $C_{1-8}$ N,N'-dialkylamino, $C_{1-8}$ substituted N,N'-dialkylamino, $C_{1-8}$ heteroalkyl, $C_{1-8}$ substituted heteroalkyl, $C_{1-8}$ alkylamino, $C_{1-8}$ substituted alkyl amino, —CN, and F.

In certain embodiments of compounds of Formula (VIII), G is chosen from $C_{1-4}$ alkyl, $C_{1-4}$ substituted alkyl, $C_{1-4}$ alkoxy, and $C_{1-4}$ substituted alkoxy.

In certain embodiments of compounds of Formula (VIII), G is chosen from $C_{1-8}$ alkyl, $C_{1-8}$ substituted alkyl, $C_{5-14}$ aryl, and $C_{5-14}$ substituted aryl.

In certain embodiments of compounds of Formula (VIII), $R^1$, $R^2$, and $R^3$ are independently chosen from alkyl, substituted alkyl, alkoxy, substituted alkoxy, amino, alkylamino, substituted alkylamino, dialkylamino, substituted dialkylamino, acyl, substituted acyl, alkoxycarbonyl, substituted alkoxycarbonyl, acyloxy, substituted acyloxy, aminoacyl, substituted aminoacyl, alkoxycarbonylamino, substituted alkoxycarbonylamino, sulfonylamino, substituted sulfonylamino, aminosulfonyl, substituted aminosulfonyl, aminocarbonyl, substituted aminocarbonyl, sulfonyl, substituted sulfonyl, sulfinyl, substituted sulfinyl, ureido, substituted ureido, phosphoamide, substituted phosphoamide, —OH, —CN, halogen, —$S(O)_2OH$, —COOH, —$N(O)_2$, —NHOH, —SOOH, —$NHNH_2$, —$NH_2$, silyl, and substituted silyl.

In certain embodiments of compounds of Formula (VIII), $Z^{101}$ and the carbon atoms to which $Z^{101}$ is attached form an unsubstituted or substituted 6-member aromatic ring.

In certain embodiments of compounds of Formula (VIII), one or more of the ligands $L^a$, $L^b$, and $L^c$ may be independently chosen from Formula (XI):

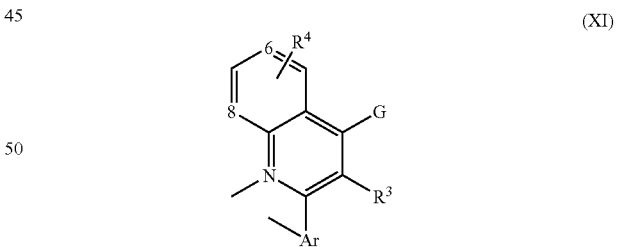

wherein $R^4$ is substituted at the 6 and 8 positions, and each $R^4$ is independently chosen from hydrogen, alkyl, substituted alkyl, heteroalkyl, substituted heteroalkyl, aryl, and substituted aryl. $R^3$, Ar, and G may be defined as described above for Formulae (I) and (II).

In certain embodiments of compounds of Formula (XI), each $R^4$ is independently chosen from $C_{1-4}$ alkyl, $C_{1-4}$ substituted alkyl, $C_{1-4}$ alkoxy, and $C_{1-4}$ substituted alkoxy.

Introduction of substituents into the 3-position and/or 4-position of the pyridine ring of the iridium compounds of the present disclosure can reduce the non-radiative decay rate and self-quenching phenomena. Non-radiative decay and self-quenching provide alternative mechanisms for depopulating excited state energy. Therefore, reducing the non-radiative decay rate and self-quenching can lead to enhanced luminescence efficiency. Variation of substituents on the 3-position and/or 4-position of the pyridine ring having certain electron-donating and electron-withdrawing properties can facilitate fine-tuning of the electroluminescent properties of the iridium compounds of the present disclosure. Selection of the substituents on the 3-position and/or 4-position can be used to optimize the brightness and efficiency of an EL light-emitting element comprising the iridium compounds of the present disclosure.

Certain examples of iridium compounds of the present disclosure include, but are not limited to, iridium compounds having the structures of Formulae (1) to (64):

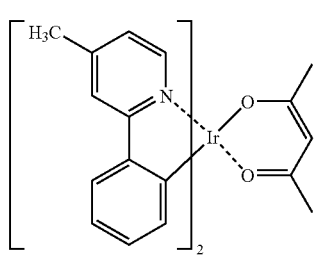
1

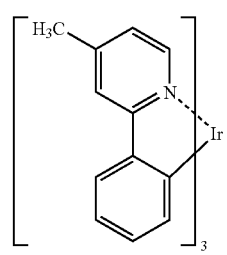
2

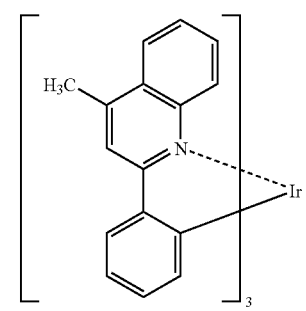
3

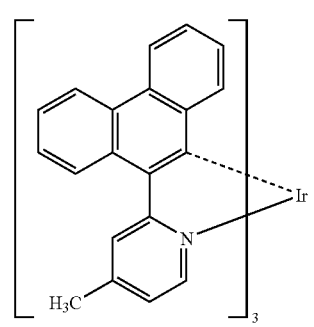
4

-continued

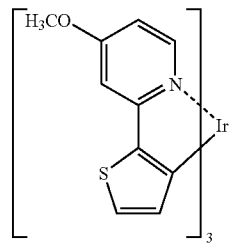
5

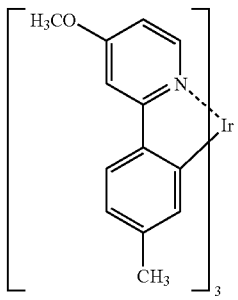
6

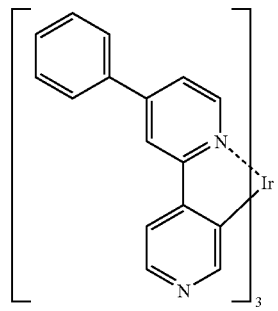
7

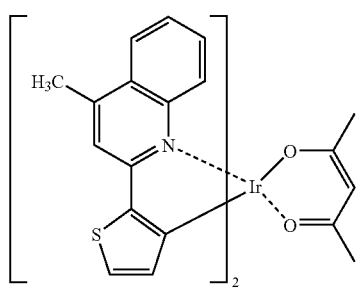
8

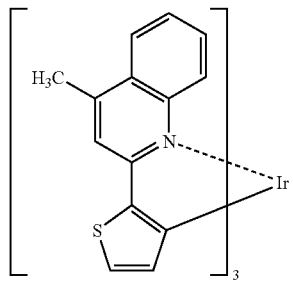
9

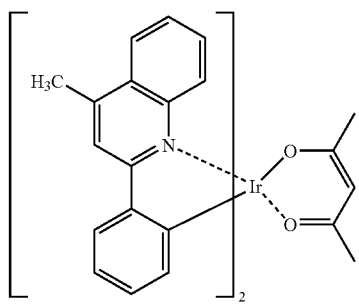
10
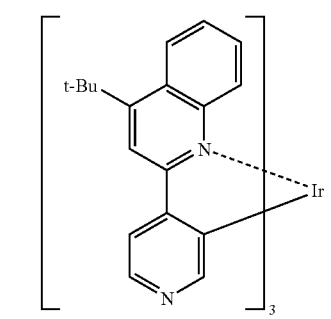
11
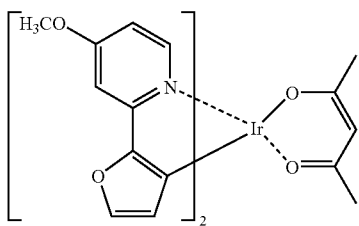
12
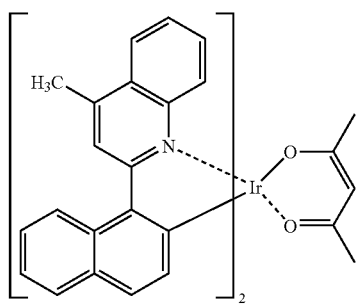
13
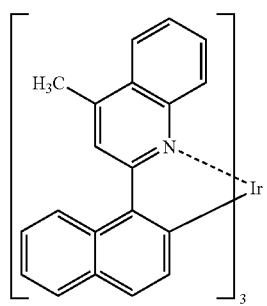
14
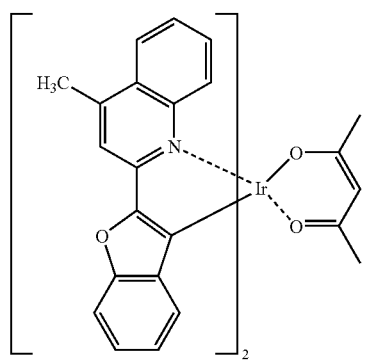
15
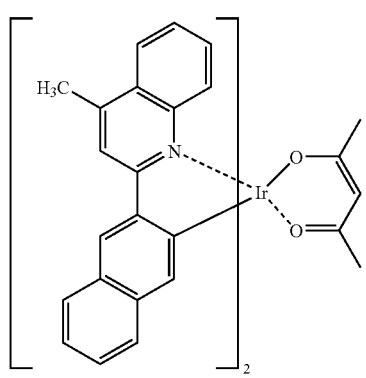
16
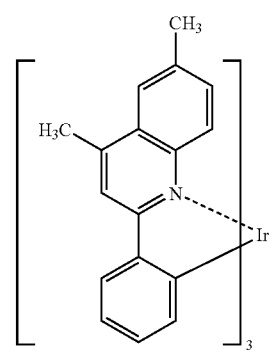
17
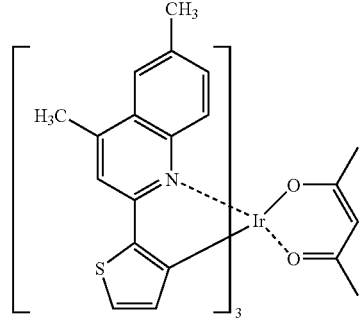
18

-continued
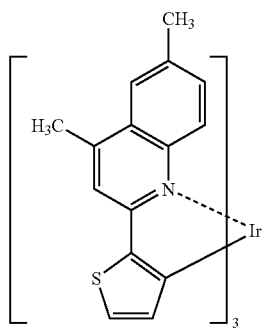
19
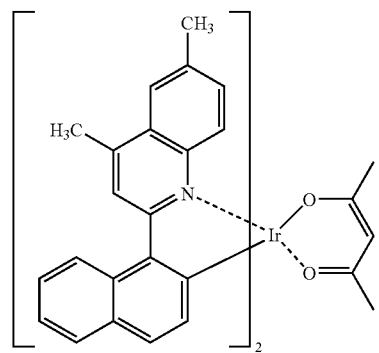
23
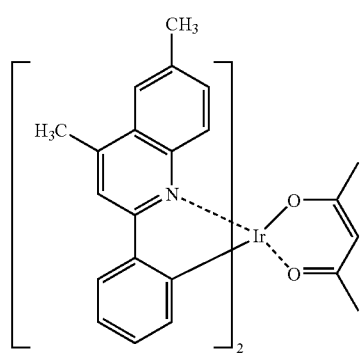
20
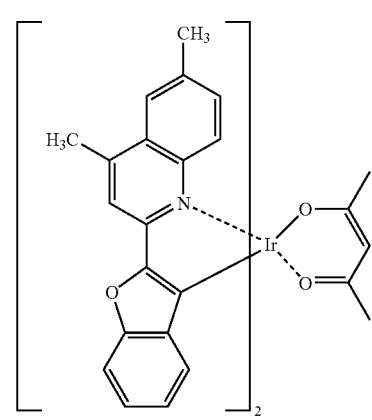
24
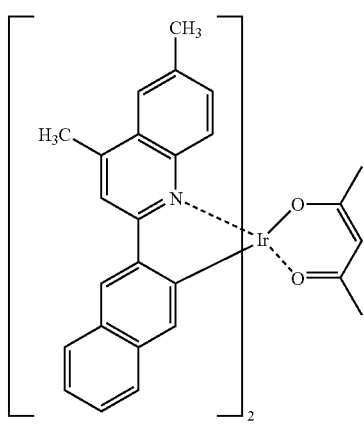
21
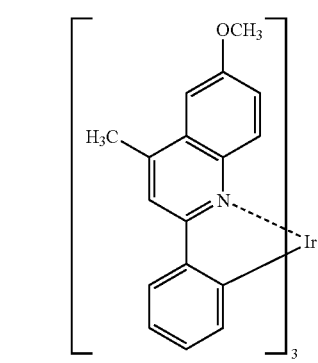
25
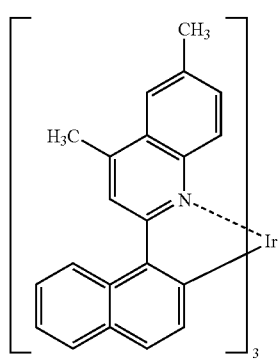
22
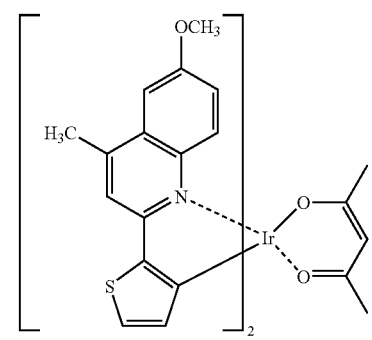
26

-continued
27
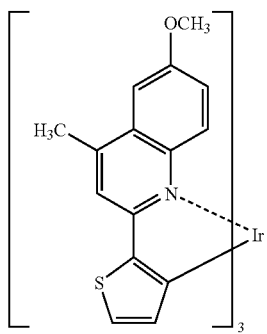
28
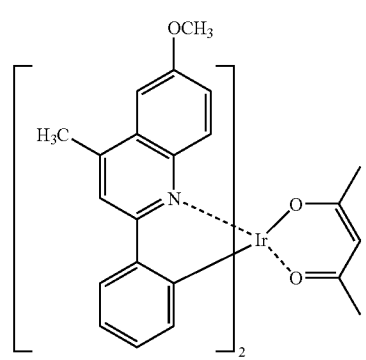
29
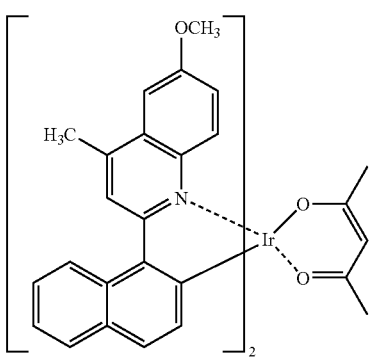
30
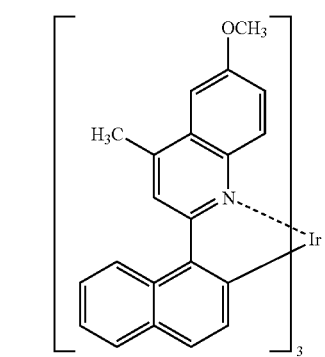
-continued
31
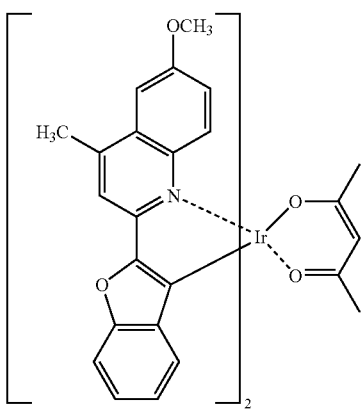
32
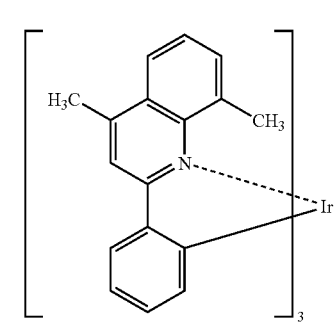
33
34
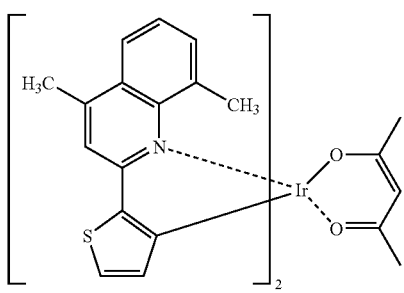

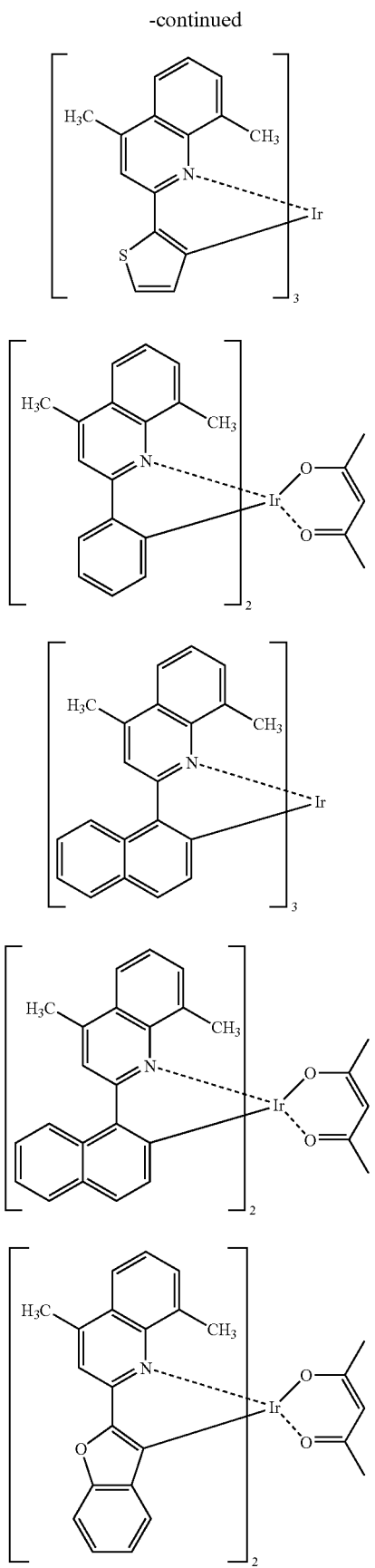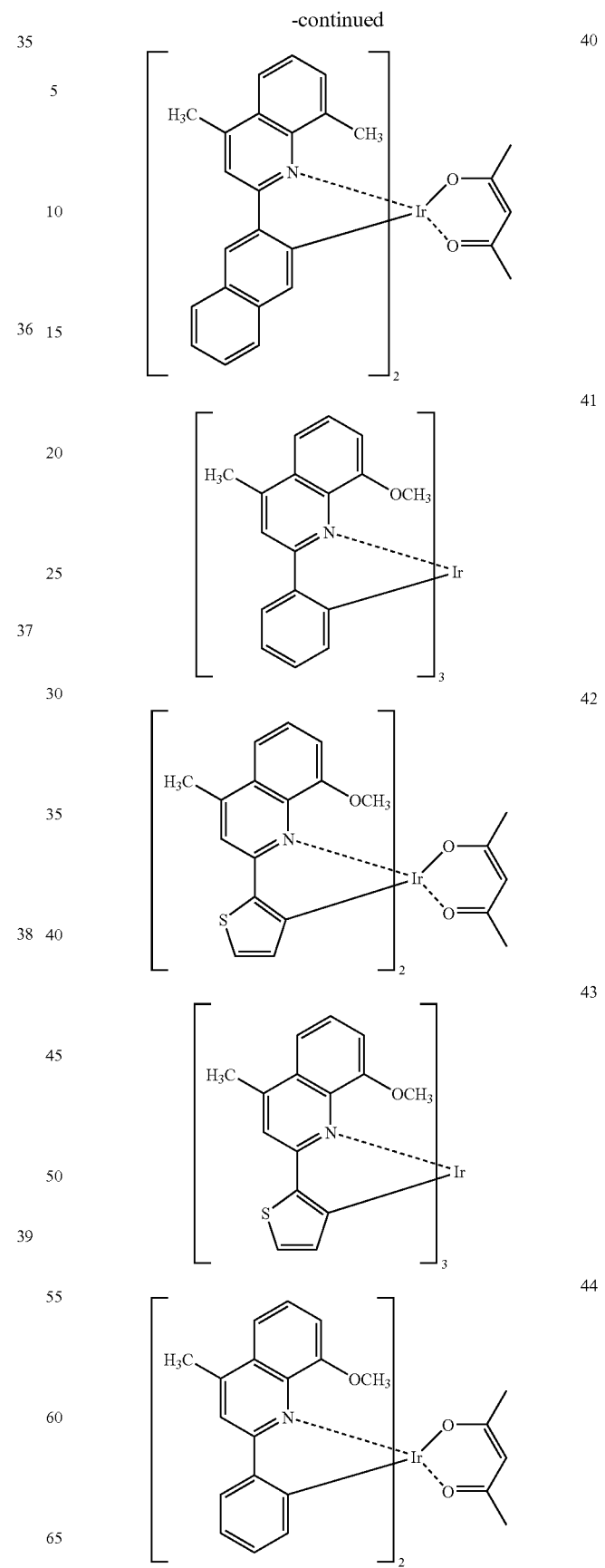

45
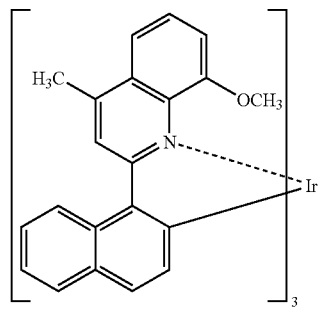
46
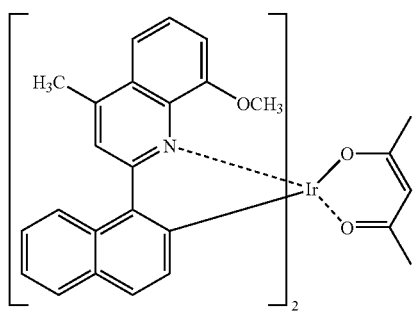
47
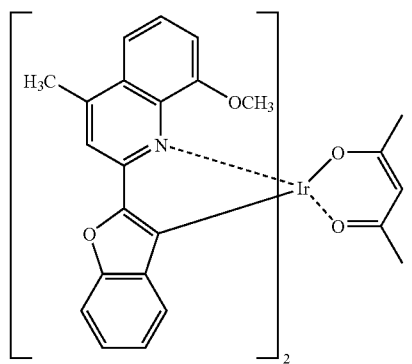
48
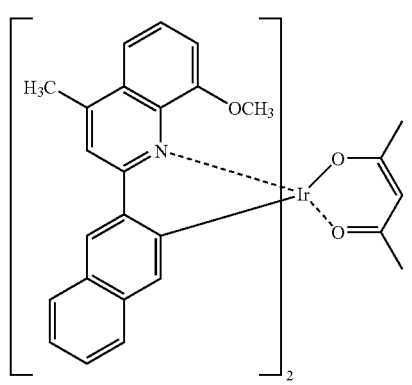
49
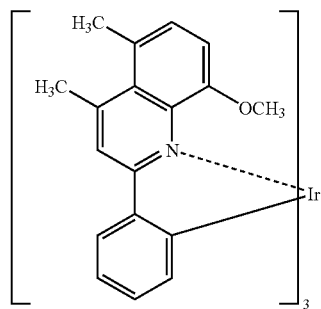
50
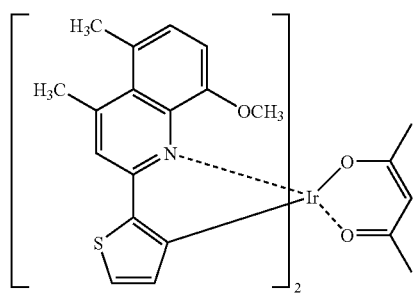
51
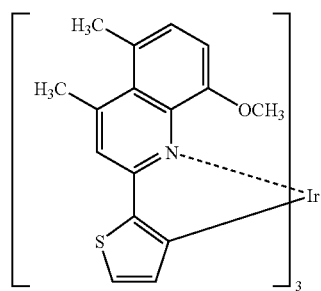
52
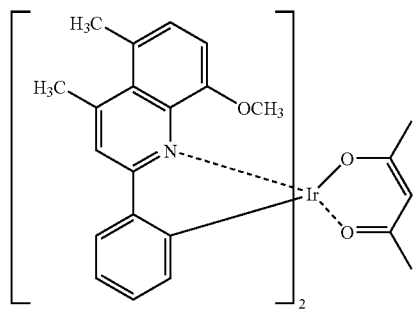
53
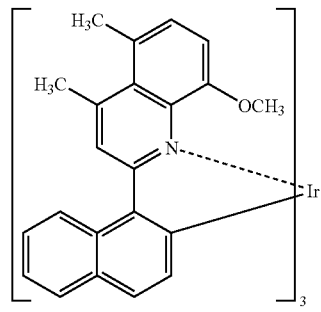

54
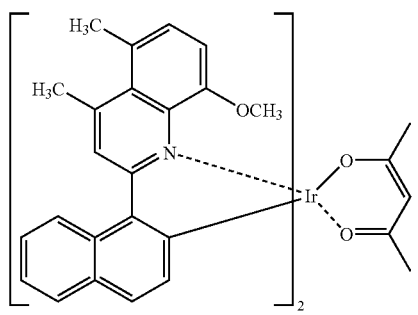
55
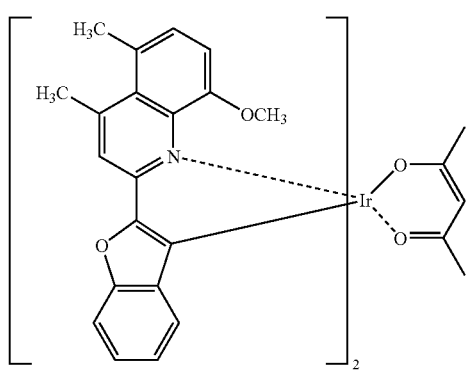
56
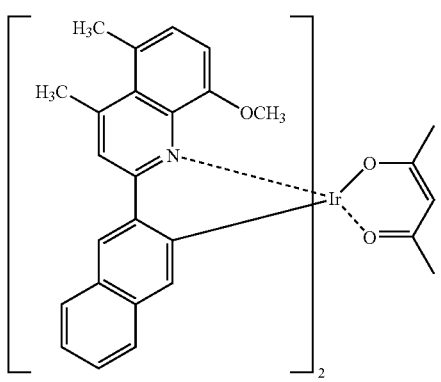
57
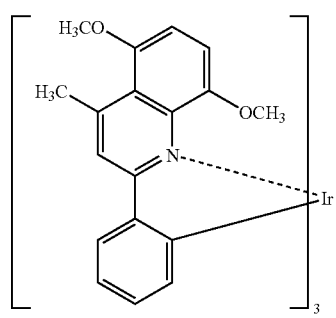
58
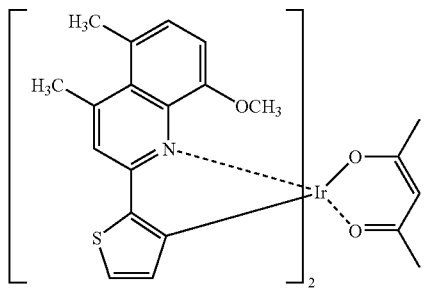
59
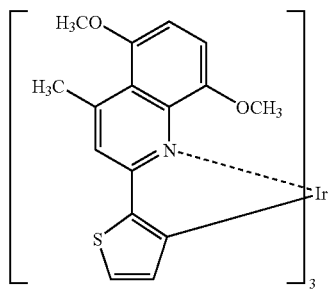
60
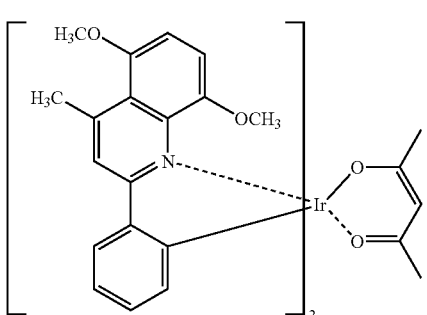
61
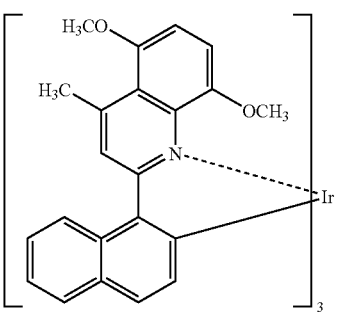
62
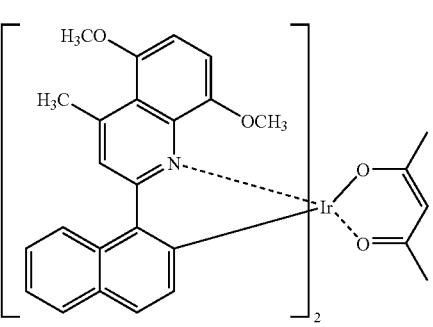

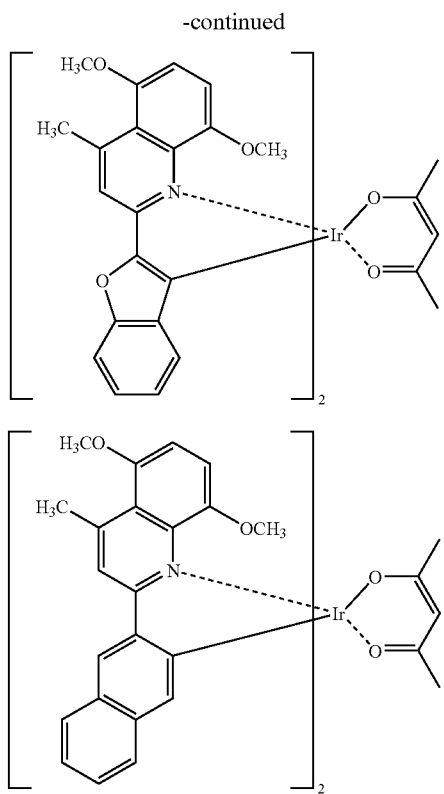

In certain embodiments, iridium compounds of the present disclosure can be used as, or incorporated into, a light-emitting layer in a light-emitting element. A light-emitting element can comprise an organic layer comprising a light-emitting layer disposed between an anode and a cathode. An organic layer can comprise a single light-emitting layer comprising at least one iridium compound of the present disclosure. In certain embodiments, an organic layer can comprise a plurality of layers including at least one light-emitting layer. For example, as further disclosed herein, at least one iridium compound of the present disclosure can be formed as a light-emitting layer disposed between an electron transporting layer and a hole-transporting layer. A light-emitting element of the present disclosure is not specifically limited in its system, driving method and/or form of utilization. A representative example of light-emitting element is an organic light-emitting diode (OLED) device.

Figure 2:
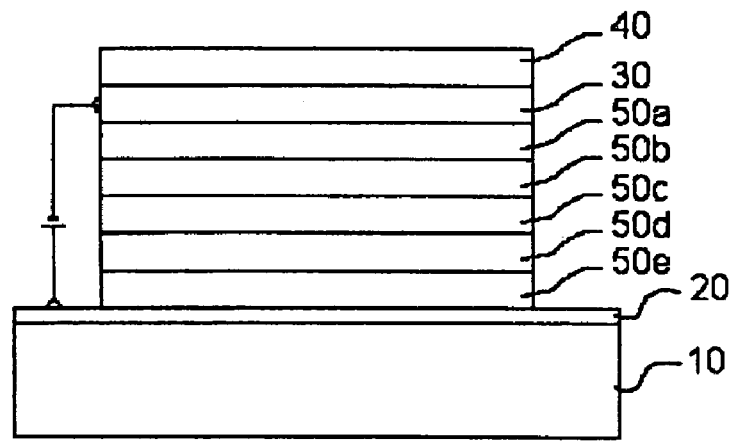
FIG. 2 is a schematic illustration of a cross-sectional view of a light-emitting element according to another embodiment of the present disclosure.
Figure 3:
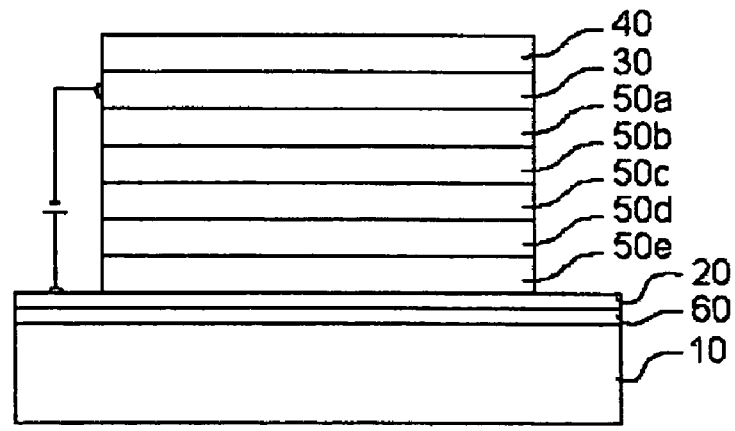
FIG. 3 is a schematic illustration of a cross-sectional view of a light-emitting element according to another embodiment of the present disclosure.

FIGS. 1, 2, and 3 illustrate embodiments of light-emitting elements according to the present disclosure. In the figures, numeral 10 indicates a substrate for forming a light-emitting element, which can comprise, for example glass, plastic, metal, ceramic, and/or other appropriate material, and/or combinations thereof. Numeral 20 indicates an anode comprising an electrically conductive material such as, for example, a metal, alloy, metal oxide, electrically conductive compound, and/or combinations thereof. Numeral 50 indicates an organic light-emitting layer, which can include one or more iridium compounds of the present disclosure as a luminescent material. Organic light-emitting layer 50 can be formed on a surface of anode 20 and by any appropriate method including, but not limited to, physical vapor deposition such as molecule beam methods, resistive heating methods, and thermal evaporation methods. Numeral 30 indicates a cathode comprising electrically conductive material such as, for example, a metal, metal alloy, metal oxide, electrically conductive organic compound, and/or combinations thereof. A schematic cross-sectional view of a light-emitting element is illustrated in FIG. 1. As shown in FIG. 1, the light-emitting element includes anode 20 disposed over substrate 10, organic light-emitting layer 50 disposed over anode 20, and cathode 30 disposed over organic light emitting layer 50.

In certain embodiments, an anode can comprise an electrically-conductive metal oxide such as, for example, tin oxide, zinc oxide, indium oxide, and indium tin oxide (ITO); a metal such as, for example, gold, silver, chromium, and nickel; or a combination and/or laminate of such metals and/or electrically-conductive metal oxides. In certain embodiments, the anode can comprise an electrically-conductive material which is optically transparent, e.g. exhibits minimal absorption at visible wavelengths, such as for example, a metal oxide such as ITO.

When a voltage potential is applied to the anode and cathode of a light-emitting element, the anode injects positive holes into a positive hole-injecting layer, positive a hole-transporting layer, or a light-emitting layer. In certain embodiments, the anode material exhibits a work function of at least 4 eV. Examples of materials exhibiting a work function of at least 4 eV include electrically conductive metal oxides such as tin oxide, zinc oxide, indium oxide, and ITO; metals such as gold, silver, chromium, and nickel; mixtures or laminates of such metals and electrically-conductive metal oxides; electrically conductive inorganic materials such as copper iodide, and copper sulfate, electrically conductive organic materials such as polyaniline, polythiophene, and polypyrrole, and laminates of these materials with ITO. The thickness of an anode can depend at least in part on the material forming the anode. For example, in certain embodiments, the thickness of an anode can range from 10 nm to 5 μm, in certain embodiments the thickness can range from 50 nm to 1 μm, and in certain embodiments the thickness can range from 100 nm to 500 nm.

An anode can be disposed on a substrate such as, for example, soda-lime glass, non-alkali glass, silica, ceramic, polymer, metal, transparent resin substrate, and/or combinations thereof In certain embodiments, a glass can comprise a non-alkali glass to reduce the amount of ions eluted therefrom. In certain embodiments, a substrate can be optically transparent. In certain embodiments, the substrate can be coated with a barrier layer. For example, soda-lime glass can be coated with a barrier, such as silica. The thickness and dimensions of the substrate are not specifically limited so far as it suffices to maintain mechanical strength sufficient to support a light-emitting element. For example, for a glass substrate, the thickness can be at least 0.2 mm, and in certain embodiments can be at least 0.7 mm.

The anode can be deposited by any appropriate method, depending at least in part on the materials forming the substrate and the anode. For example, an anode comprising ITO can be formed by electron beam deposition, sputtering, resistively-heated vacuum evaporation, chemical reaction method (sol-gel method), or a method involving the coating of a dispersion of indium tin oxide or the like.

The anode can be cleaned or otherwise treated to lower the driving voltage of a device or to enhance the light emission efficiency of a device. For example, an anode comprising ITO can be exposed to UV-ozone treatment, plasma treatment, or other process.

A cathode can comprise an electrically conducting material such as a metal, alloy, metal halide, metal oxide, electrically-conductive compound, and/or mixtures thereof. Examples of such materials include, but are not limited to, alkaline metals such as Li, Na, K, and fluorides thereof; alkaline earth metals such as Mg, Ca, and fluorides thereof; gold, silver, lead, aluminum, sodium-potassium alloys, and mixtures thereof; lithium-aluminum alloys, and mixtures thereof; magnesium-silver alloys, and mixtures thereof; and rare earth metals such as indium and ytterbium. For example, the cathode may comprise indium tin oxide. A cathode can be in the form of a single layer structure comprising one or more of the foregoing compounds or combinations, or can comprise a laminated structure comprising a plurality of layers formed from one or more of the foregoing materials.

The cathode supplies electrons into an electron-injecting layer, electron-transporting layer, or light-emitting layer. The appropriate cathode material can at least in part be determined by the adhesion of the cathode material to adjacent layers, such as an electron-injecting layer, an electron-transporting layer, or a light-emitting layer, the ionization potential, and the stability. In certain embodiments, materials having a work function of 4.5 eV or less may be used. In certain embodiments, the cathode material can be chosen from aluminum, lithium-aluminum alloys, mixtures of lithium and aluminum, magnesium-silver alloys, and mixtures of magnesium and silver. The cathode can be in the form of single layer structure comprising one or more of the foregoing compounds or mixtures thereof, or alternatively, can be in the form of a laminated structure comprising one or more of the foregoing compounds or mixtures thereof. The thickness of the cathode can depend at least in part on the material from which it is made. For example, the thickness of the cathode layer can range from 10 nm to 5 µm, in certain embodiments can range from 50 nm to 1 µm, and in certain embodiments can range from 100 nm to 1 µm.

The cathode can be formed by any appropriate method, such as an electron beam method, sputtering method, resistively-heated vacuum evaporation method, and coating method. When a vacuum evaporation method is used, a single material can be vacuum-vaporized, or alternatively, two or more components may be vacuum-vaporized at the same time. Further, a plurality of metals can be vacuum-vaporized to form an alloy electrode. Alternatively, a previously prepared alloy can be vacuum-vaporized.

In certain embodiments, the sheet resistivity of the anode and cathode is minimized, and thus may be, for example, hundreds of ohm/or less.

In certain light-emitting elements of the present disclosure, organic layer 50 can comprise a plurality of organic layers. An example of organic layer 50 comprising a plurality of organic layers is schematically illustrated in FIG. 2. As shown in FIG. 2, organic layer 50 comprises an electron transporting layer 50a, a hole blocking layer 50b, a light-emitting layer 50c, a hole transporting layer 50d, and a hole injection layer 50e. Light-emitting layer 50c can comprise at least one iridium compound of the present disclosure. In certain embodiments, light-emitting layer 50c can comprise one or more host materials in which at least one iridium compound of the present disclosure resides as a guest. The host material can, for example, comprise a hole-transporting material, such as one or more substituted tri-aryl amines, or the host material can comprise an electron-transporting material such as one or more metal quinoxolates, oxadiazoles, and triazoles. An example of a host material is 4,4'-N,N'-dicarbazole-biphenyl (CBP), having the formula:

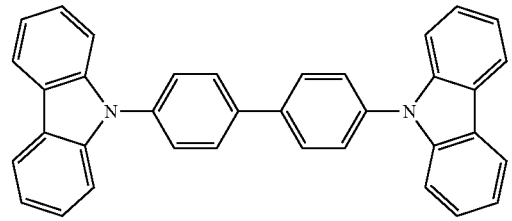

Electron transporting layer 50a can transport electrons from cathode 30 into light-emitting layer 50c. Electron transporting layer 50a can be formed from an electron-transporting material such as, but not limited to, one or more metal quinoxolates, oxadiazoles, triazoles, and/or combinations thereof. An example of an electron transporting material is tris-(8-hydroxyquinoline) aluminum ($Alq_3$).

Electron-transporting layer 50a can comprise any appropriate material having the capability of injecting electrons when bias is applied to cathode 30, having the capability of transporting electrons, and having the capability of acting as a barrier to holes injected into the structure at the anode. Examples of materials for forming electron transporting layer 50a include, but are not limited to, metal complexes. Examples of metal complexes include metal complexes having ligands chosen from heterocyclic tetracarboxylic anhydrides, such as triazole derivatives, oxazole derivatives, oxadiazole derivatives; fluorenone derivatives; anthraquinodimethane derivatives; anthrone derivatives; diphenylquinone derivatives; thiopyranedioxide derivatives; carbodiimide derivatives; fluorenilidenemethane derivatives; distyrylpyrazine derivatives; naphthaleneperylene; phthalocyanine derivatives; 8-quinolinol derivatives; metal complexes comprising metal phthalocyanine, benzoxazole or benzothiazole as a ligand; organic silane derivatives; and the ligands of the present disclosure.

Electron-transporting layer 50a can be formed by any known method, such as vacuum evaporation methods, Langmuir-Blodgett methods, solvent coating methods such as, spin coating methods, casting methods, and dip coating methods, ink jet methods and printing methods. In the case of solution or dispersion coating methods, the foregoing positive electron-injecting or electron-transporting materials can be dissolved or dispersed in a solvent with a resin component. The resin component can comprise one or more of the resins for forming the hole-injecting layer 50e and hole transporting layer 50d as disclosed herein.

The thickness of electron-transporting layer 50a can be any appropriate thickness. In certain embodiments, the thickness of layer 50a can range from 1 nm to 5 um, in certain embodiments can range from 5 nm to 1 um, and in certain embodiments can range from 10 nm to 500 nm. Electron-injecting layer 30a and electron-transporting layer 50a can comprise a single layer or a plurality of layers comprising one or more of the foregoing materials, or each of the plurality of layers can comprise the same or different materials, and/or compositions.

Positive hole transporting layer 50d can transport holes from hole-injection layer 50e into light-emitting layer 50c. Hole transporting layer 50d can comprise, for example, α-naphthylphenyl benzidine (α-NPB).

Hole-transporting layer 50d and positive hole-injecting layer 50e can comprise a material capable of injecting positive holes from the anode, capable of transporting positive holes, and capable of acting as a barrier to electrons injected from the cathode. Examples of such materials include electrically-conductive polymers such as carbazole derivatives, triazole derivatives, oxazole derivatives, oxadiazole derivatives, imidazole derivatives, polyarylalkane derivatives, pyrazoline derivatives, pyrazolone derivatives, phenylenediamine derivatives, arylamine derivatives, amino-substituted chalcone derivatives, styrylanthracene derivatives, fluorenone derivatives, hydrazone derivatives, stilbene derivatives, silazalane derivatives, aromatic tertiary amine compounds, styrylamine compounds, aromatic dimethylidine compounds, porphyrin compounds, polysilane compounds, poly(N-vinylcarbazole) derivatives, aniline copolymers, thiophene oligomers and polythiophene, organic silane derivatives, carbon films, and iridium complexes of the present disclosure.

The thickness of positive hole-injecting layer 50e and positive hole-transporting layer 50d can be any appropriate thickness. In certain embodiments, the thickness of hole-injecting layer 50e and hole-transporting layer 50d can range from 1 nm to 5 µm, in certain embodiments can range from 5 nm to 1 µm, and in certain embodiments can range from 10 nm to 500 nm. Hole-injecting layer 50e and hole-transporting layer 50d can each comprise a single layer or a plurality of layers in which each of the plurality of layers comprise the same or different materials and/or compositions.

Hole-injecting layer 50e and hole-transporting layer 50d can be formed by any appropriate method known in the art, including vacuum evaporation methods, Langmuir-Blodgett methods, solvent coating methods such as spin coating methods, casting methods, and dip coating methods, ink jet methods, printing methods, and the like. In solvent coating mehtods, one or more positive hole-injecting materials or positive hole-transporting materials can be dissolved and/or dispersed in a solvent, optionally comprising a resin component. Examples of resin components include polyvinyl chloride, polycarbonate, polystyrene, polymethyl methacrylate, polybutyl methacrylate, polyester, polysulfone, polyphenylene oxide, polybutadiene, poly(N-vinylcarbazole), hydrocarbon resin, ketone resin, phenoxy resin, polyamide, ethyl cellulose, vinyl acetate, acrylonitrile-butadiene-styrene resin, polyurethane, melamine resin, unsaturated polyester resin, alkyl resin, epoxy resin, and silicon resin.

In certain embodiments, hole blocking layer 50b can confine excitons within light-emitting layer 50c. In certain embodiments, hole blocking layer 50b can comprise 2,9-dimethyl-4,7-diphenyl-1,10-phenanthroline (BCP), having the formula:

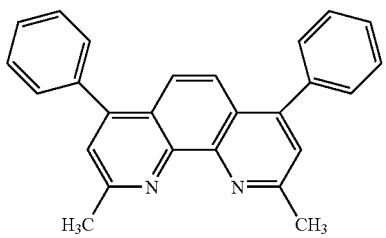

As illustrated in FIG. 2, protective layer 40 can be disposed on cathode 30 to minimize or prevent mechanical, chemical, thermal, and/or environmental degradation of the light emitting element. For example, in certain embodiments protective layer 40 can minimize or prevent $O_2$, water, and/or corrosive gases from entering the device to thereby cause degradation of device performance. Protective layer 40 can be formed from materials, including, but not limited to, In, Sn, Pb, Au, Cu, Ag, Al, Ti, and Ni; metal oxides such as MgO, SiO, $SiO_2$, $Al_2O_3$, GeO, NiO, CaO, BaO, $Fe_2O_3$, $Y_2O_3$, and $TiO_2$; metal fluorides such as $MgF_2$, LiF, $AlF_3$, and $CaF_2$; ZnS, ZnSe, arylamine, arylfluoride, polyethylene, polypropylene, polymethyl methacrylate, polyimide, polyurea, polytetrafluoroethylene, polychlorotrifluoroethylene, polydichlorofluoroethylene, polymers of chlorotrifluoroethylene with dichlorodifluoroethylene, copolymers obtained by the copolymerization of tetrafluoroethylene with a monomer mixture comprising at least one monomer, fluorine-containing copolymers having a cyclic structure in the copolymer main chain, water-absorbing materials having a water absorption of 1% or more, and moisture-resistant materials having a water absorption of 0.1% or less. Protective layer 40 can comprise a single layer or a plurality of layers including, for example, one or more of any of the foregoing materials, wherein each of the plurality of layers can comprise the same or different materials and/or amounts of materials. In certain embodiments, protective layer 40 can be optically transparent.

A light-emitting element as illustrated in FIG. 2, is referred to herein as a "bottom emission" structure. In a "bottom emission" structure, light generated in light-emitting layer 50c is radiated through anode 20 and substrate 10. A light-emitting element as illustrated in FIG. 2, which employs a "bottom emission" structure, can generate spatial luminance non-uniformities in luminance, which can be particularly apparent for light-emitting elements with large dimensions. Light-emitting elements with improved luminance uniformity can be provided by employing a "top emission" structure as illustrated in FIG. 3.

A cross-sectional view of a "top emission" light emitting element comprising an optically transparent cathode 30, and a reflective layer 60 disposed between anode 20 and substrate 10 is illustrated in FIG. 3. In top-emission light emitting element as illustrated in FIG. 3, optical emission generated in light emitting layer 50c can be radiated from the device through optically transparent cathode 30 and protective layer 40. As shown in FIG. 3, optically reflective layer 60 disposed between substrate 10 and anode 20 reflects incident radiation from light-emitting layer 50c toward cathode 30.

Synthesis of Certain Compounds

Iridium complexes of the present disclosure can be synthesized by any known method. Examples of such methods are disclosed in: Inorg. Chem., No. 30, p. 1,685, 1991; Inorg. Chem., No. 27, p. 3464, 1988; Inorg. Chem., No. 33, p. 545, 1994; Inorg. Chem. Acta., No. 181, p. 245, 1991; J. Organomet. Chem., No. 35, p. 293, 1987; and J. Am. Chem. Soc., No. 107, p. 1431, 1985. The relevant portions of each of these references are incorporated herein by reference.

Compounds of the present disclosure can be prepared from readily available starting materials using the following general methods and procedures and as disclosed in the examples. It will be appreciated that where typical or preferred process conditions, such as, reaction temperatures, times, mole ratios of reactants, solvents, pressures, are given, other process conditions can also be used unless otherwise stated. While reaction conditions may vary with the reactants or solvent used, appropriate conditions can be determined by one skilled in the art by routine optimization procedures.

General synthetic schemes and specific reaction protocols used to prepare compounds of the present disclosure are presented in the reaction schemes and Examples provided herein. For example, tris-halogenated iridium (m), and trisacetylacetonato iridium (III) can be used as starting materials to synthesize compounds of the present disclosure:

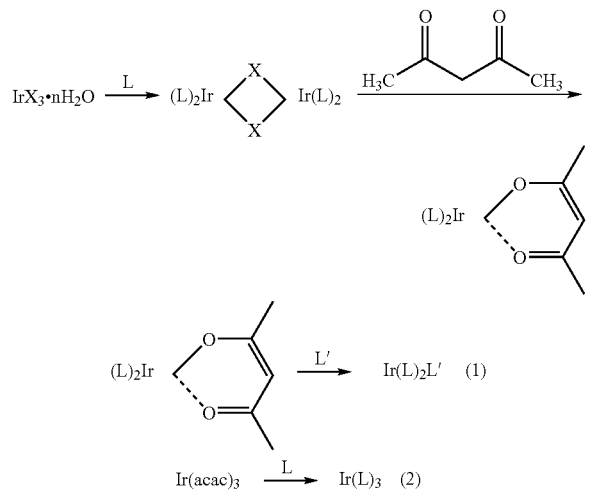

EXAMPLES

Embodiments of the present disclosure can be further defined by reference to the following examples, which describe in detail preparation of iridium compounds and light-emitting elements of the present disclosure and procedures for characterizing iridium compounds and light-emitting elements of the present disclosure. It will be apparent to those skilled in the art that many modifications, both to materials and methods, may be practiced without departing from the scope of the present disclosure.

In the examples below, the following abbreviations have the following meanings. If an abbreviation is not defined, it has its generally accepted meaning.

| | |
|---|---|
| Ir(acac)$_3$ = | iridium (III) trisacetylacetonato |
| g = | gram |
| mL = | milliliter |
| min = | minute |
| min = | millimeter |
| α-NPB = | α-naphthylphenyl benzidine |
| CBP = | 4,4'-N,N'-dicarbazole-biphenyl |
| BCP = | 2,9-dimethyl-4,7-diphenyl-1,10-phenanthroline |
| (Alq)$_3$ = | tris-(8-hydroxyquinoline) aluminum |
| ITO = | indium tin oxide |
| hr = | hour |
| mol = | mole |
| n-BuLi = | n-butyl lithium |
| nm = | nanometer |
| cd/A = | external quantum yield |
| Ir(ppy)$_3$ = | tris(2-phenylpyridine) iridium |

Example 1

Synthesis of Compound 1

A two necked round-bottom flask (250 mL) containing a stir bar fitted with a reflux condenser was evacuated and purged with nitrogen gas. Dry ether (50 mL) and bromobenzene (0.0191 mol, 3.0 g) were added to the flask followed by the slow addition of n-BuLi (0.0229 mol, 9.17 mL) via a syringe pump. The reaction mixture was stirred at room temperature for 30-40 min and then 4-methyl pyridine (0.0191 mol, 1.779 g) was slowly added. The reaction mixture was then refluxed for 2 to 3 hr. The reaction mixture was then cooled to room temperature, diluted with an aqueous brine solution and extracted with ether (3×30 mL). The combined extracts were dried over magnesium sulfate and concentrated under reduced pressure. The residue was purified by column chromatography using hexanes/EA as eluent. The desired 4-methyl-2-phenylpyridine was obtained. (1.15 g; 36% yield).

A mixture of IrCl$_3$.nH$_2$O (14.9 g), 4-methyl-2-phenylpyridine (30.8 g), water (10 ml), and 2-ethoxyethanol (400 mL) was vigorously stirred under reflux for 10 hr. A solution of 10% HCl (50 mL) was then added, and the mixture stirred under reflux for an additional 2 hr. The mixture was then cooled to room temperature, diluted with 50 mL of methanol, and filtered. The solid was washed with water, and dried under vacuum to produce 21 g of the iridium chloro-dimer.

A mixture of the iridium chloro-dimer (11.3 g), acetylacetone (6.4 g), Na$_2$CO$_3$ (2.1 g), and 2-ethoxyethanol (100 mL) was stirred under reflux for 8 hr. The mixture was then cooled to room temperature, diluted with 50 mL of methanol, and filtered. The solid was washed with water, and dried under vacuum to produce 5.2 g of iridium compound 1 (45% yield). Compound 1 was purified by vacuum sublimation, and the solution fluorescent spectrum of the compound measured. The fluorescence spectrum of compound 1 exhibited a $\lambda_{max}$ of 511 nm (CH$_2$Cl$_2$). $^1$H NMR (CDCl$_3$, 400 MHz) (ppm): δ 1.75 (s, 6H), 2.54 (s, 6H), 5.17 (s, 1H), 6.26 (d, J=8.0 Hz, 2H), 6.65 (t, J=7.2 Hz, 2H), 6.76 (t, J=7.2 Hz, 2H), 6.93 (d, J=6.0 Hz, 2H), 7.79 (d, J=8.4 Hz, 2H), 7.62 (s, 2H), 8.32 (d, J=5.6 Hz, 2H).

Example 2

Synthesis of Compound 2

3.0 g of 4-methyl-2-phenylpyridine, 1.3 g of trisacetylacetonato iridium(III), and 50 mL of glycerol were mixed and stirred under a nitrogen atmosphere at 200° C. for 16 hr. After cooling to room temperature, 200 mL of methanol was added to the reaction mixture, and the solid precipitate filtered out. The solid was purified by vacuum sublimation to obtain 2.0 g of iridium compound 2 (58% yield). Compound 2 was purified by vacuum sublimation. The solution fluorescent spectrum of Compound 2 exhibited a $\lambda_{max}$ of 516 nm (CH$_2$Cl$_2$). $^1$H NMR (CDCl$_3$, 400 MHz) (ppm): δ 2.54 (s, 6 H), 6.26 (d, J=8.0 Hz, 2 H), 6.65 (t, J=7.2 Hz, 2 H), 6.76 (t, J=7.2 Hz, 2 H), 6.93 (d, J=6.0 Hz, 2 H), 7.79 (d, J=8.4 Hz, 2 H), 7.62 (s, 2 H), 8.32 (d, J=5.6 Hz, 2 H).

Example 3

Synthesis of Compound 8

A two necked round-bottom flask (250 mL) containing a stir bar fitted with a reflux condenser was evacuated and purged with nitrogen gas. Dry ether (50 mL) and 2-bromothiophene (0.0191 mol, 3.06 g) was added to the flask followed by the slow addition of n-BuLi (0.0229 mol, 9.17 mL) via a syringe pump. The reaction mixture was stirred at room temperature for 30 min to 40 min and then 4-methylquinoline (0.0191 mol, 2.72 g) was slowly added. The reaction mixture was refluxed for an additional 2 to 3 hr. The reaction mixture was then cooled to room temperature and diluted with an aqueous brine solution and extracted with ether (3×30 mL). The combined extracts were dried over magnesium sulfate and concentrated under reduced pressure. The residue was purified by column chromatography using hexanes/$CH_2Cl_2$ as eluent to afford 2.77 g of 4-methyl-(2-thiophenyl)quinoline (65% yield).

A mixture of $IrCl_3 \cdot nH_2O$ (14.9 g), 4-methyl-2-thiophenylquinoline (40.5 g), water (10 ml), and 2-ethoxyethanol (400 mL) was vigorously stirred under reflux for 10 hr. A solution of 10% HCl (50 mL) was then added, and the mixture was stirred under reflux for an additional 2 hr. The mixture was cooled to room temperature, diluted with 50 ml of methanol, and filtered. The solid was washed with water, and dried under vacuum to produce 25 g of the iridium chloro-dimer.

A mixture of the iridium chloro-dimer (14 g), acetylacetone (6.4 g), $Na_2CO_3$ (2.1 g) and 2-ethoxyethanol (100 mL) was stirred under reflux for 8 hr. The mixture was cooled to room temperature, diluted with 50 mL of methanol, and filtered. The solid precipitate was washed with water, and dried under vacuum to produce 5.0 g of iridium compound 8 (35% yield). The solution fluorescence spectrum of compound 8 exhibited a $\lambda_{max}$ of 614 nm ($CH_2Cl_2$). $^1$HNMR: δ 1.59 (s, 6H), 2.86 (s, 6H), 4.81 (s, 1H), 6.21 (d, J=6.4 Hz, 2H), 7.07 (d, J=6.4 Hz, 2H), 7.42 (m, 4H), 7.54 (s, 2H), 7.85 (d, J=7.2 Hz, 2H), 8.34 (d, J=7.2 Hz, 2H).

Example 4

Synthesis of Compound 13

A two necked round-bottom flask (250 mL) containing a stir bar fitted with a reflux condenser was evacuated and purged with nitrogen gas. Dry ether (50 mL), and α-bromo-naphthalene (0.0191 mol, 3.95 g) were added to the flask followed by the slow addition of n-BuLi (0.0229 mol, 9.17 mL) via a syringe pump. The reaction mixture was stirred at room temperature for 30 min to 40 min and then 4-methylquinoline (0.0191 mol, 2.72 g) was slowly added. The reaction mixture was refluxed for an additional 2 hr to 3 hr. The reaction mixture was then cooled to room temperature and diluted with an aqueous brine solution and extracted with ether (3×30 mL). The combined extracts were dried over magnesium sulfate and concentrated under reduced pressure. The residue was purified by column chromatography using hexanes/EA as eluent to afford 4.08 g of 4-methyl-(2-naphthalene) quinoline (80% yield).

A mixture of $IrCl_3 \cdot nH_2O$ (14.9 g), 4-methyl-(2-naphthalene) quinoline (48.42 g), water (10 mL), and 2-ethoxyethanol (400 mL) was vigorously stirred under reflux for 10 hours. A solution of 10% HCl (50 mL) was then added, and the mixture stirred under reflux for 2 hr. The mixture was cooled to room temperature, diluted with 50 mL of methanol, and filtered. The solid precipitate was washed with water, and dried under vacuum to produce 25 g of the iridium chloro-dimer.

A mixture of the iridium chloro-dimer (14 g), acetylacetone (6.4 g), $Na_2CO_3$ (2.1 g), and 2-ethoxyethanol (100 mL) was stirred under reflux for 8 hr. The mixture was then cooled to room temperature, diluted with 50 mL of methanol, and filtered. The solid precipitate was washed with water, and dried under vacuum to produce 7.2 g of iridium compound 13 (52% yield). Compound 13 was purified by vacuum sublimation. The solution fluorescence spectrum of compound 13 exhibited a $\lambda_{max}$ of 625 nm ($CH_2Cl_2$). $^1$HNMR: δ 1.42 (s, 6H), 2.96 (s, 6H), 4.53 (s, 1H), 6.72 (d, J=8.8 Hz, 2H), 6.95 (d, J=8.4 Hz, 2H), 7.30 (m, 4H), 7.48 (m, 4H), 7.62 (d, J=8.4 Hz, 2H), 7.93 (d, J=8.4 Hz, 2H), 8.28 (d, J=8.8 Hz, 2H), 8.52 (s, 2H), 8.68 (d, J=8.8 Hz, 2H).

Example 5

Synthesis of Compound 15

A two necked round-bottom flask (250 mL) containing a stir bar fitted with a reflux condenser was evacuated and purged with nitrogen gas. Dry ether (50 mL), and 2,3-benzofuran (0.0191 mol, 2.24 g) were added to the flask and n-BuLi (0.0229 mole, 9.17 mL) slowly added via a syringe pump. The reaction mixture was stirred at room temperature for 30 min to 40 min, following which 4-methyl quinoline (0.0191 mol, 2.72 g) was slowly added. The reaction mixture was then refluxed for an additional 2 hr to 3 hr. The reaction mixture was then cooled to room temperature, diluted with an aqueous brine solution and extracted with ether (3×30 mL). The combined extracts were dried over magnesium sulfate and concentrated under reduced pressure. The residue was purified by column chromatography using hexanes/EA as eluent to afford 2.95 g of 4-methyl-[2-(2,3-benzofuran)] quinoline (60% yield).

IA mixture of $IrCl_3 \cdot nH_2O$ (14.9 g), 4-methyl-[2-(2,3-benzofuran)]quinoline (46.62 g), water (10 mL), and 2-ethoxyethanol (400 mL) was vigorously stirred under reflux for 10 hr. A solution of 10% HCl (50 mL) was then added, and the mixture stirred under reflux for 2 hr. The mixture was cooled to room temperature, diluted with 50 mL of methanol, and filtered. The solid precipitate was washed with water, and dried under vacuum to produce 25 g of the iridium chloro-dimer.

A mixture of the iridium chloro-dimer (14 g), acetylacetone (6.4 g), $Na_2CO_3$ (2.1 g), and 2-ethoxyethanol (100 mL) was stirred under reflux for 8 hr. The mixture was cooled to room temperature, diluted with 50 mL of methanol, and filtered. The solid precipitate was washed with water, and dried under vacuum to produce 7 g of iridium compound 15 (50% yield). Compound 15 was purified by vacuum sublimation. The solution fluorescent spectrum exhibited a $\lambda_{max}$ of 625 nm ($CH_2Cl_2$). $^1$HNMR: δ 1.58 (s, 6H), 2.97 (s, 6H), 4.82 (s, 1H), 6.00 (d, J=7.6 Hz, 2H), 6.56 (d, J=7.6 Hz, 2H), 7.00 (m, 2H), 7.38 (m, 6H), 7.72 (s, 2H), 7.85 (d, J=8.0 Hz, 2H), 8.32 (d, J=8.0 Hz, 2H).

Example 6

Synthesis of Compound 16

A two necked round-bottom flask (250 mL) containing a stir bar fitted with a reflux condenser was evacuated and purged with nitrogen gas. Dry ether (50 mL) and α-bromo-naphthalene (0.0191 mol, 3.95 g) were added to the flask followed by the slow addition of n-BuLi (0.0229 mol, 9.17 mL) via a syringe pump. The reaction mixture was then stirred at room temperature for 30 min to 40 min. 4-methyl quinoline (0.0191 mol, 2.72 g) was then slowly added, and the reaction mixture refluxed for an additional 2 hr to 3 hr. The reaction mixture was then cooled to room temperature, diluted with an aqueous brine solution, and extracted with ether (3×30 mL). The combined extracts were dried over magnesium sulfate and concentrated under reduced pressure. The residue was purified by column chromatography using hexanes/EA as eluent to afford 2.55 g of 4-methyl-(2-β-naphthalene)quinoline (50% yield).

A mixture of $IrCl_3 \cdot nH_2O$ (1.49 g), 4-methyl-(2-β-naphthalene)quinoline (4.66 g), water (2 mL), and 2-ethoxyethanol (40 mL) was vigorously stirred under reflux for 10 hr. A solution of 10% HCl (5 mL) was then added, and the mixture was stirred under reflux for an additional 2 hr. The mixture was cooled to room temperature, diluted with 5 mL of methanol, and filtered. The precipitated solid was washed with water, and dried under vacuum to produce 2.5 g of the iridium chloro-dimer.

A mixture of the iridium chloro-dimer (1.4 g), acetylacetone (0.64 g), $Na_2CO_3$ (0.21 g), and 2-ethoxyethanol (10 mL) was stirred under reflux for 8 hr. The mixture was then cooled to room temperature, diluted with 5 mL of methanol, and filtered. The precipitated solid was washed with water, and dried under vacuum to afforded 0.85 g of iridium compound 16 (61% yield). Compound 16 was purified by vacuum sublimation. The solution fluorescent spectrum exhibited a $\lambda_{max}$ of 616 nm ($CH_2Cl_2$). $^1$HNMR: $\delta$ 1.45 (s, 6H), 3.00 (s, 6H), 4.61 (s, 1H), 6.88 (s, 2H), 7.10 (m, 6H), 7.38 (m, 2H), 7.45 (d, J=8.0 Hz, 2H), 7.77 (d, J=8.0 Hz, 2H), 8.00 (d, J=8.0 Hz, 2H), 8.19 (s, 2H), 8.35 (s, 2H), 8.60 (d, J=8.4 Hz, 2H).

Example 7

Bottom Emission OLED Device Comprising Comparative Compound A

Comparative compound A, Ir(Ppy)$_3$, has the following structure:

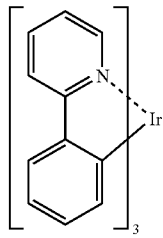

A layer of indium tin oxide (ITO) having a thickness of from 50 to 200 nm was deposited on a glass substrate. The ITO was patterned by etching unwanted ITO with 1N HCl solution to form a first electrode pattern. The ITO patterned substrate was then ultrasonically cleaned in aqueous detergent solution. The ITO patterned substrate was then rinsed with distilled water, followed by isopropanol. The cleaned, ITO patterned substrate was then loaded into a vacuum chamber and the chamber was pumped down to $10^{-6}$ torr. The base vacuum for all thin film deposition was in the range of $10^{-6}$ torr. The ITO patterned substrate was then further cleaned with an oxygen plasma for about 5 to 10 min.

Multiple layers of thin films were sequentially deposited on the ITO patterned substrate by thermal evaporation. First, an α-NPB (N,N'-diphenyl-N,N'-di(α-naphthyl)benzidine) layer was vacuum-evaporated onto the ITO patterned substrate to a thickness of 50 nm. Compound CBP and iridium compound A in a ratio of 10:1 were then simultaneously vacuum-evaporated onto the α-NPB layer to a thickness of 30 mn. Compound BCP was then vacuum-evaporated to a thickness of 10 nm. Alq$_3$ was then vacuum-evaporated over the BCP layer to a thickness of 40 mn.

Patterned metal electrodes were then deposited by first positioning a mask over the organic layer such that a 3 mm×3 mm light-emitting area was defined. Magnesium and silver were then simultaneously vacuum-evaporated onto the thin organic layer at a ratio of 10:1 to a thickness of 55 nm in a vacuum metallizer. Silver was then vacuum-evaporated over the Mg/Ag layer to a thickness of 50 nm. Finally, a protective layer was deposited over the Ag cathode.

The thickness of the layers was measured during deposition using a quartz crystal monitor. The completed OLED device was characterized in a nitrogen atmosphere. A DC constant voltage was applied to the OLED device thus prepared to cause the emission of light.

Example 8

Bottom Emission OLED Device Comprising Comparative Compound B

Comparative compound B has the following structure:

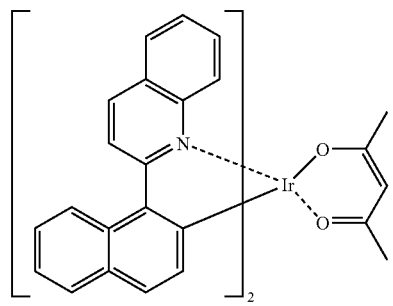

An OLED device was prepared using the process set forth in Example 7, except that comparative iridium compound B was substituted for iridium compound A.

Example 9

Bottom Emission OLED Device Comprising Compound 2

An OLED device was prepared using the process set forth in Example 7, except that iridium compound 2, according to the present disclosure, was substituted for iridium compound A.

Example 10

Bottom Emission OLED Device Comprising Compound 8

An OLED device was prepared using the process set forth in Example 7, except that iridium compound 8, according to the present disclosure, was substituted for iridium compound A.

Example 11

Bottom Emission OLED Device Comprising Compound 13

An OLED device was prepared using the process set forth in Example 7, except that iridium compound 13, according to the present disclosure, was substituted for iridium compound A.

Example 12

Top Emission OLED Devices

OLED devices employing a "top emission" structure as illustrated in FIG. 3 were fabricated using the methods, procedures, and equipment as described herein for the fabrication of OLED devices employing a "bottom emission" structure. The "top emission" OLED devices comprised the following layers: Al/Ni metal anode, NPB hole injection layer, CBP/Iridium complex, BCP hole blocking layer, Alq$_3$ electron transporting layer, calcium cathode, and a protective layer. The multiplayer of Al/Ni of anode was deposited sequentially on a glass substrate. The thickness of Al layer varies from 20 to 500 nm which forms a reflective layer. The thickness of Ni varies from 1 to 100 nm. During the evaporating Al/Ni, the multiplayer of Al/Ni was patterned by metal mask for defining the region and shape. The Al/Ni substrate was then further cleaned with an oxygen plasma.

The completed EL devices were characterized by measuring (1) current-voltage (I-V) curves, (2) electroluminescence radiance versus voltage, and (3) electroluminescence spectra versus applied voltage. I-V curves were measured using a Keithley Source-Measurement Unit (SMU) model 2400. The electroluminescence radiance in units of cd/m$^2$ and the electroluminescence spectrum as a finction of applied voltage were measured using a Photo Research PR650 spectroradiometer, while the voltage was scanned using the Keithley SMU. The external quantum efficiency, $\eta_{Qe}$, was measured using the PR650 spectroradiometer, which also provided a measure of the photon flux, with a measured Lambertian distribution. The efficiency of an OLED device at certain applied voltage in units of cd/A was determined by dividing the electroluminescence radiance of the OLED device by the current density needed to activate the device.

Measurements of OLED device characteristics are provided in Tables 1, 2, 3.

TABLE 1

Green Emission

| Compound | Device Structure | External Quantum Efficiency | Voltage | Peak Efficiency cd/A | Wavelength $\lambda_{max}$ (nm) |
|---|---|---|---|---|---|
| Compound A | Bottom Emission | 8.05% | 7.5 | 30.23 | 514 |
| Compound 2 | Bottom Emission | 9.05% | 7.5 | 35.7 | 513 |
| Compound A | Top Emission | 10.65% | 6 | 40.1 | 514 |
| Compound 2 | Top Emission | 12.5% | 6 | 47 | 513 |

TABLE 2

Red Emission

| Compound | Device Structure | External Quantum Efficiency | Voltage | Peak Efficiency cd/A | Wavelength $\lambda_{max}$ (nm) |
|---|---|---|---|---|---|
| Compound B | Bottom Emission | 3.64% | 7.5 | 2.73 | 634 |
| Compound 13 | Bottom Emission | 5.91% | 7.5 | 5.40 | 630 |
| Compound 13 | Top Emission | 11.8% | 7.5 | 10.8 | 630 |

TABLE 3

Other Emission Wavelength

| Compound | Device Structure | External quantum Efficiency | Voltage | Peak Efficiency cd/A | Wavelength $\lambda_{max}$ (nm) |
|---|---|---|---|---|---|
| Compound 8 | Bottom Emission | 12.53% | 7.5 | 18.2 | 614 |
| Compound 8 | Top Emission | 17.2% | 7.5 | 25 | 614 |

Peak efficiency is an important attribute of an electroluminescent device. The peak efficiency provides a measure of the number of injected electrons required to produce a certain number of radiated photons, and thus is a measure of the device efficiency. A higher efficiency translates into lower power consumption for a certain radiance. A higher electron to photon conversion efficiency also results in fewer non-radiative processes that can otherwise generate heat and produce undesirable chemical reactions. As demonstrated in Tables 1 and 2, iridium complexes of the present disclosure exhibit higher peak efficiencies than the corresponding parent compound.

Other embodiments of the present disclosure will be apparent to those skilled in the art from consideration of the specification and practice of the invention as disclosed herein. It is intended that the specification and examples be considered as exemplary only, with a true scope and spirit of the present disclosure being indicated by the following claims.

What is claimed is:

1. A light-emitting material comprising a compound chosen from Formulae (8), (9), and (15):

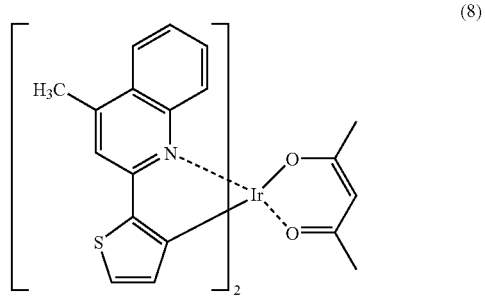

(8)

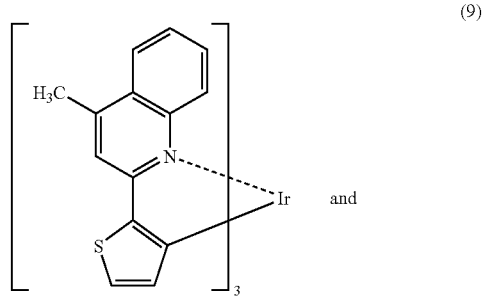

(9) and

-continued

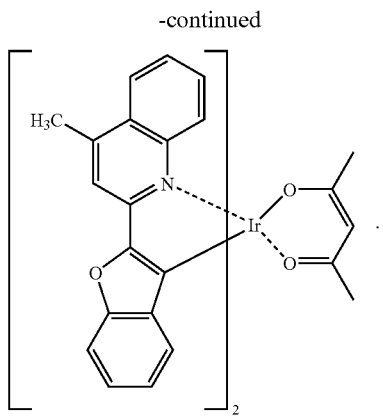
(15)

2. A light-emitting element, comprising:
an anode;
a cathode; and
an organic layer comprising a light-emitting layer disposed between the anode and the cathode;
wherein the light-emitting layer comprises at least one compound chosen from Formulae (8), (9), and (15):

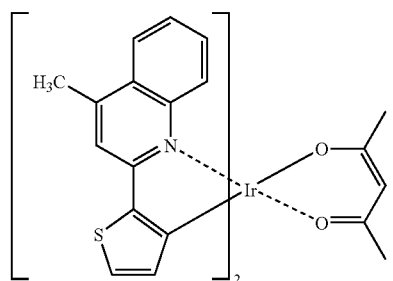
(8)

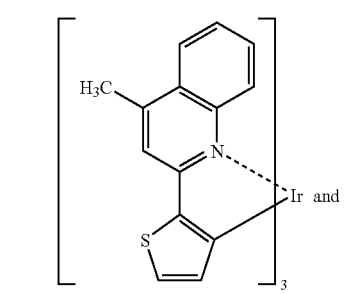
(9)

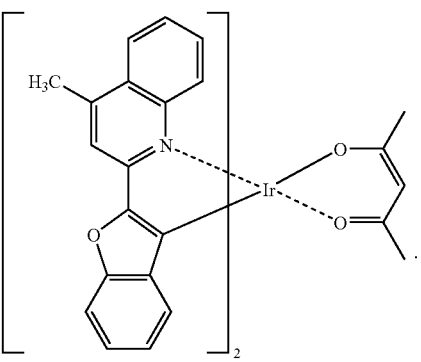
(15)

3. The light-emitting element of claim 2, wherein the organic layer further comprises an electron transporting layer disposed between the cathode and the light-emitting layer, and a hole transporting layer disposed between the light-emitting layer and the anode.

4. The light-emitting element of claim 3, wherein the organic layer further comprises a hole blocking layer disposed between the electron transporting layer and the light-emitting layer, and a hole injection layer disposed between the hole transporting layer and the anode.

5. The light-emitting element of claim 2, comprising an optically reflective layer disposed over the anode, and wherein the cathode is optically transparent.

6. A light-emitting material comprising a compound chosen from Formulae (18), (19), (24), (26), (27) and (31):

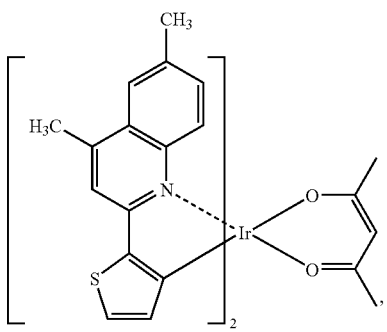
(18)

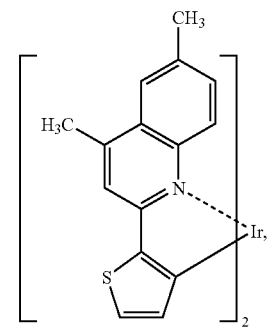
(19)

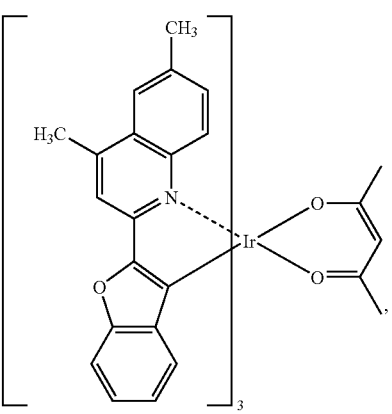
(24)

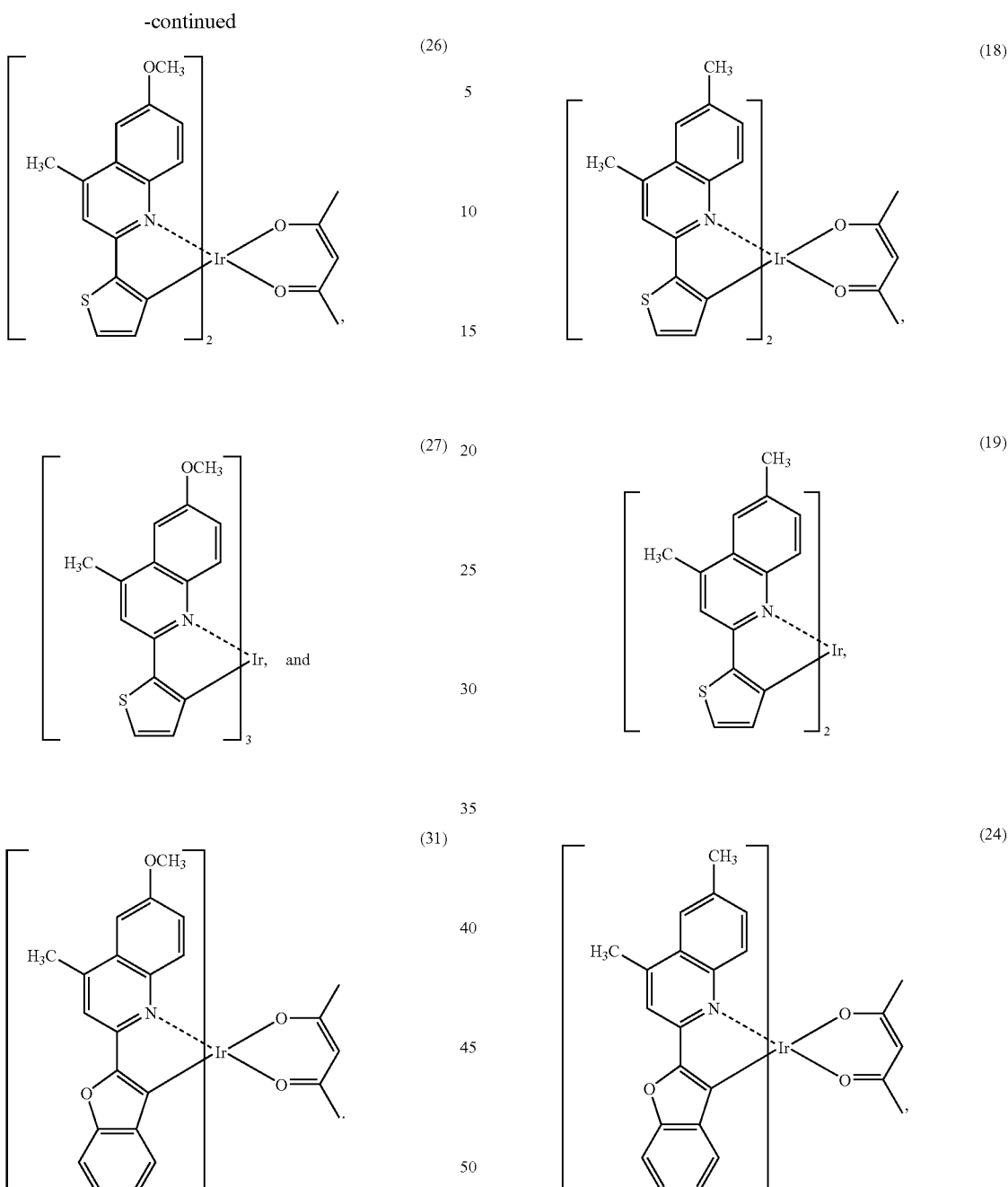
7. A light-emitting element comprising
an anode;
a cathode; and
an organic layer comprising a light-emitting layer disposed between the anode and the cathode;
wherein the light-emitting layer comprises at least one compound chosen from Formulae (18), (19), (24), (26), (27) and (31):

-continued

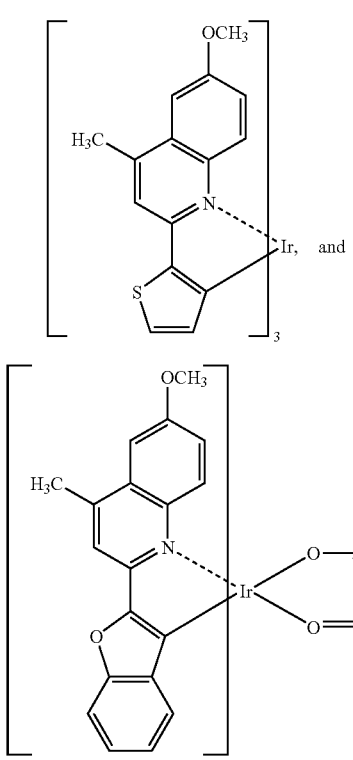

(27)

(31)

8. The light-emitting element of claim 7, wherein the organic layer further comprises an electron transporting layer disposed between the cathode and the light-emitting layer, and a hole transporting layer disposed between the light-emitting layer and the anode.

9. The light-emitting element of claim 8, wherein the organic layer further comprises a hole blocking layer disposed between the electron transporting layer and the light-emitting layer, and a hole injection layer disposed between the hole transporting layer and the anode.

10. The light-emitting element of claim 7, comprising an optically reflective layer disposed over the anode, and wherein the cathode is optically transparent

* * * * *